(12) United States Patent
Estep et al.

(10) Patent No.: US 11,843,624 B1
(45) Date of Patent: Dec. 12, 2023

(54) TRAINED MODEL TO DETECT MALICIOUS COMMAND AND CONTROL TRAFFIC

(71) Applicant: Netskope, Inc., Santa Clara, CA (US)

(72) Inventors: Colin Estep, Eagle, ID (US); Siying Yang, Saratoga, CA (US); Jenko Hwong, San Mateo, CA (US); Gustavo Palazolo Eiras, São Paulo (BR); Yongxing Wang, San Ramon, CA (US); Dagmawi Mulugeta, London (GB); Raymond Joseph Canzanese, Jr., Philadelphia, PA (US)

(73) Assignee: Netskope, Inc., Santa Clara, CA (US)

( * ) Notice: Subject to any disclaimer, the term of this patent is extended or adjusted under 35 U.S.C. 154(b) by 0 days.

(21) Appl. No.: 17/863,337

(22) Filed: Jul. 12, 2022

(51) Int. Cl.
*H04L 29/06* (2006.01)
*H04L 9/40* (2022.01)
*G06Q 20/40* (2012.01)

(52) U.S. Cl.
CPC ..... *H04L 63/1425* (2013.01); *G06Q 20/4016* (2013.01)

(58) Field of Classification Search
CPC .................. H04L 63/1425; G06Q 20/4016
See application file for complete search history.

(56) References Cited

U.S. PATENT DOCUMENTS

| | | |
|---|---|---|
| 8,321,943 B1 | 11/2012 | Walters et al. |
| 8,788,407 B1 | 7/2014 | Singh et al. |
| 9,043,894 B1 | 5/2015 | Dennison et al. |
| 9,628,498 B1 | 4/2017 | Aziz et al. |
| 10,341,391 B1 | 7/2019 | Pandey et al. |
| 10,666,676 B1 | 5/2020 | Hsu et al. |
| 10,681,080 B1 | 6/2020 | Chen |
| 10,764,313 B1 | 9/2020 | Mushtaq |
| 10,778,702 B1 | 9/2020 | Huang et al. |
| 11,038,906 B1 | 6/2021 | Bingham et al. |
| 11,303,657 B2 | 4/2022 | Kuperman et al. |
| 2008/0082662 A1 | 4/2008 | Dandliker et al. |
| 2008/0276319 A1 | 11/2008 | Rittermann |
| 2011/0302656 A1 | 12/2011 | El-Moussa |

(Continued)

OTHER PUBLICATIONS

Anonymous, Abusing the cloud for command and control, HackCon IT-SECPRO, dated Feb. 16, 2022, 4 pages. Retrieved on Mar. 9, 2022. Retrieved from the internet [URL: https://go.hackcon.org/events/cloudmalw/].

(Continued)

*Primary Examiner* — Ka Shan Choy

(57) ABSTRACT

The technology disclosed relates to a method, system, and non-transitory computer-readable media that classifies cloud traffic between a client and cloud application as malicious command and control (C2) cloud traffic or benign cloud traffic. A cloud traffic classifier, in communication with a network security system, is provided intercepted cloud traffic as an input, and generate an output that classifies the cloud traffic as malicious command and control (C2) cloud traffic or benign cloud traffic. The classifier may use signals such as beaconing behavior, anomalous entity, anomalous agent, anomalous username, anomalous username, anomalous agent, cat's paw behavior of the client, anomalous hostname access patterns, and/or malicious task sequence execution.

20 Claims, 14 Drawing Sheets

(56) References Cited

U.S. PATENT DOCUMENTS

| | | | |
|---|---|---|---|
| 2012/0060221 A1 | 3/2012 | Gerber et al. | |
| 2015/0350193 A1 | 12/2015 | Honda et al. | |
| 2015/0370723 A1 | 12/2015 | Nambiar et al. | |
| 2016/0134651 A1* | 5/2016 | Hu | H04L 63/1416 726/23 |
| 2016/0156655 A1 | 6/2016 | Lotem et al. | |
| 2016/0330236 A1 | 11/2016 | Reddy et al. | |
| 2016/0381023 A1* | 12/2016 | Dulce | H04L 63/1408 726/9 |
| 2018/0176240 A1* | 6/2018 | Kopp | H04L 63/0428 |
| 2018/0189677 A1* | 7/2018 | Anderson | G06N 20/00 |
| 2018/0191763 A1* | 7/2018 | Hillard | H04L 63/1416 |
| 2018/0316727 A1 | 11/2018 | Tsironis | |
| 2018/0359811 A1 | 12/2018 | Verzun et al. | |
| 2018/0367547 A1 | 12/2018 | Jang et al. | |
| 2019/0109876 A1* | 4/2019 | Bhargava | H04L 63/0464 |
| 2019/0297096 A1 | 9/2019 | Ahmed et al. | |
| 2019/0377893 A1 | 12/2019 | Ciziunas et al. | |
| 2020/0045075 A1 | 2/2020 | Kliger et al. | |
| 2020/0153928 A1 | 5/2020 | Chauhan et al. | |
| 2020/0162484 A1 | 5/2020 | Solis Agea et al. | |
| 2020/0374324 A1 | 11/2020 | Le Strat et al. | |
| 2021/0021637 A1* | 1/2021 | Srivastava | H04L 63/0876 |
| 2021/0058395 A1 | 2/2021 | Jakobsson | |
| 2021/0126938 A1 | 4/2021 | Trost et al. | |
| 2021/0325867 A1 | 10/2021 | Palazzola et al. | |
| 2022/0035910 A1 | 2/2022 | Ellam et al. | |
| 2022/0060491 A1 | 2/2022 | Achleitner et al. | |
| 2022/0131879 A1 | 4/2022 | Naik et al. | |
| 2022/0300584 A1 | 9/2022 | Fleck et al. | |
| 2022/0353284 A1* | 11/2022 | Vörös | H04L 63/20 |

OTHER PUBLICATIONS

Passeri, Cloud Threats Memo: Exploting Legitimate Cloud Services for Command and Control, Netskope, dated Jan. 14, 2022, 4 pages. Retrieved on Mar. 9, 2022. Retrieved from the internet [URL: https://www.netskope.com/blog/cloud-threats-memo-exploiting-legitimate-cloud-services-for-command-and-control ].

Sood et al., Cloudifying Threats—Understanding Cloud App Attacks and Defenses, ISACA Journal, vol. 1, dated Jan. 1, 2018, 17 pages.

Anonymous, Man in the Cloud (MITC) Attacks, Hacker Intelligence Initiative, Imperva, dated 2015, 16 pages.

Galinkin, SLUB's the Word: Cover CnC over Slack, Netskope, dated May 8, 2019, 5 pages. Retrieved on Mar. 9, 2022. Retrieved from the internet [URL: https://www.netskope.com/blog/slubs-the-word-covert-cnc-over-slack].

Galinkin, Why the Future of Command and Control is the Cloud, Netskope, dated Aug. 10, 2019, 4 pages. Retrieved on Mar. 9, 2022. Retrieved from the internet [URL: https://www.netskope.com/blog/why-the-future-of-command-and-control-is-the-cloud].

Brenton, Beacon Analysis—The Key to Cyber Threat Hunting, Active Countermeasures, dated Aug. 6, 2018, 10 pages. Retrieved on Mar. 9, 2022. Retrieved from the internet [URL: https://www.activecountermeasures.com/blog-beacon-analysis-the-key-to-cyber-threat-hunting/].

Neupane et al., Using AI to Detect Malicious C2 Traffic, Palo Alto Networks, dated May 24, 2021, 10 pages. Retrieved on Mar. 9, 2022. Retrieved from the internet [URL: https://unit42.paloaltonetworks.com/c2-traffic/].

Anonymous, C2 Beaconing: Definition, Examples and Prevention, retrieved on Mar. 9, 2022, 4 pages. Retrieved from the internet [URL: https://www.extrahop.com/resources/attacks/c-c-beaconing/].

Crispin, Internet Message Access Protocol—Version 4rev1, The Internet Society, dated Mar. 2003, 98 pages. Retrieved on Apr. 25, 2022. Retrieved from the internet [URL: https://www.ietf.org/rfc/rfc3501.txt].

Fielding et al., RFC 2616: Hypertext Transfer Protocol—HTTP/1.1, Jun. 1999, Internet Engineering Task Force, dated Jun. 1999, retrieved on Apr. 25, 2022, 160 pages. Retrieved from the internet [URL: https://www.ietf.org/rfc/rfc2616.txt].

Klensin, RFC 2821: Simple Mail Transfer Protocol, Apr. 2001, Internet Engineering Task Force, 72 pages. Retrieved on Apr. 25, 2022. Retrieved from the internet [URL: https://www.ietf.org/rfc/rfc2821.txt].

Myers et al., RFC 1939: Post Office Protocol—Version 3, May 1996, Internet Engineering Task Force, 21 pages. Retrieved on Apr. 25, 2022. Retrieved from the internet [URL: https://www.ietf.org/rfc/rfc1939.txt].

Parmar et al., Adobe's Real Time Messaging Protocol, Dec. 21, 2012, Adobe, 52 pages, retrieved on Apr. 25, 2022. Retrieved from the internet [URL: https://github.com/runner365/read_book/blob/master/rtmp/rtmp_specification_1.0.pdf].

Postel et al., RFC 959: File Transfer Protocol (FTP), Oct. 1985, Internet Engineering Task Force, 64 pages. Retrieved on Apr. 25, 2022. Retrieved from the internet [URL: https://www.ietf.org/rfc/rfc959.txt].

Schulzrinne et al, RFC 2326: Real Time Streaming Protocol (RTSP), Internet Engineering Task Force, Apr. 1998, 84 pages. Retrieved on Apr. 25, 2022. Retrieved from the internet [URL: https://www.ietf.org/rfc/rfc2326.txt].

Sermersheim, RFC 4511: Lightweight Directory Access Protocol (LDAP): The Protocol, Jun. 2006, Internet Engineering Task Force, 62 pages. Retrieved on Apr. 25, 2022. Retrieved from the internet [URL: https://www.ietf.org/rfc/rfc4511.txt].

Anonymous, Open BSD manual page server, tftp(1), dated May 1, 2012, 3 pages. Retrieved on Apr. 25, 2022. Retrieved from the internet [URL: https://man.openbsd.org/tftp.1].

Cheng et al., "Cloud Security for Dummies, Netskope Special Edition," John Wiley & Sons, Inc., dated 2015, 53 pages.

"Netskope Introspection," netSkope, Inc., 2015, 3 pgs.

NETSKOPE, "Data Loss Prevention and Monitoring in the Cloud", Nov. 2014, 18 pages.

"Cloud Data Loss Prevention Reference Architecture", Netskope, Sep. 2015, WP-88-1, 2 pages.

"The Netskope Active Platform Enabling Safe Migration to the Cloud", Apr. 2015, DS-1-8, Netskope, Inc., 6 pages.

"The Netskope Advantage: Three "Must-Have" Requirements for Cloud Access Security Brokers", Jul. 2015, WP-12-2, 4 pages.

"Netskope The 15 Critical CASB Use Cases", Netskope Inc., EB-141-1, dated 2015, 19 pages.

"Repave the Cloud-Data Breach Collision Course," netSkope, Inc., 2014, 6 pgs.

NetSkope, "The 5 Steps to Cloud Confidence," netSkope Inc., 2014, 11 pgs.

"Netskope Cloud Confidence Index," netSkope, Inc., 2015, 4 pgs.

U.S. Appl. No. 17/863,311, filed Jul. 12, 2022, Pending.

U.S. Appl. No. 17/863,327, filed Jul. 12, 2022, Pending.

* cited by examiner

700

C3 Default Endpoints 702

| C3 Function | URL |
|---|---|
| WRITEMESSAGETOFILE | HTTPS://CONTENT.DROPBOXAPI.COM/2/FILES/UPLOAD |
| LISTCHANNELS | HTTPS://API.DROPBOXAPI.COM/2/FILES/LIST_FOLDER |
| CREATECHANNEL | HTTPS://API.DROPBOXAPI.COM/2/FILES/CREATE_FOLDER_V2 |
| GETMESSAGEBYDIRECTION | HTTPS://API.DROPBOX.COM/2/FILES/SEARCH_V2 |
| READFILE | HTTPS://CONTENT.DROPBOXAPI.COM/2/FILES/DOWNLOAD |
| DELETEFILE | HTTPS://API.DROPBOXAPI.COM/2/FILES/DELETE_V2 |

C3 Code 704

```
std::expected<std::string, std::string> FSecure::Dropbox::GetMessageByDirection(std::string search_direction)
{
    std::expected<std::string, std::string> messages;
    json response;
    std::string cursor;

// If our search results roll over to another page (unlikely) we use a different endpoint
    // to retrieve the extra file details
    do
    {
        if (cursor.empty())
        {
            std::string url = OBF("https://api.dropbox.com/2/files/search_v2");

json search_options;
            search_options[OBF("path")] = OBF("/") + this->m_Channel;
            search_options[OBF("filename_only")] = true;
            json j;
            j[OBF("query")] = OBF("^") + direction;
            j[OBF("options")] = search_options;

response = SendJsonRequest(url, j);
        }
    }
}
```

FIG. 7A

TRAINED MODEL TO DETECT MALICIOUS COMMAND AND CONTROL TRAFFIC

RELATED APPLICATIONS

This application is related to the following contemporaneously filed applications which are incorporated by reference for all purposes as if fully set forth herein:

U.S. patent application Ser. No. 17/863,311, titled "DETECTING MALICIOUS COMMAND AND CONTROL CLOUD," filed Jul. 12, 2022, issued as U.S. Pat. No. 11,736,513 on Aug. 22, 2023; and U.S. patent application Ser. No. 17/863,327, titled "TRAINING A MODEL TO DETECT MALICIOUS COMMAND AND CONTROL CLOUD," filed Jul. 12, 2022, issued as U.S. Pat. No. 11,616,799 on Mar. 28, 2023.

INCORPORATIONS

The following are incorporated by reference as if fully set forth herein:

Passeri, Cloud Threads Memo: Exploiting Legitimate Cloud Services for Command and Control, 14 Jan. 2022, retrieved from https://www.netskope.com/blog/cloud-threats-memo-exploiting-legitimate-cloud-services-for-command-and-control Open BSD manual page server, tftp(1), dated 21 Dec. 2012, retrieved from https://man.openbsd.org/tftp.1

Parmar et al., Adobe's Real Time Messaging Protocol, 21 Dec. 2012, Adobe, retrieved from https://github.com/runner365/read book/blob/master/rtmp/rtmp_specification_1.0.pdf Postel et al., RFC 959: File Transfer Protocol (FTP), October 1985, Internet Engineering Task Force, retrieved from https://www.ietforg/rfc/rfc959.txt Myers et al., RFC 1939: Post Office Protocol—Version 3, May 1996, Internet Engineering Task Force, retrieved from https://www.ietforg/rfc/rfc1939.txt Schulzrinne et al, RFC 2326: Real Time Streaming Protocol (RTSP), Internet Engineering Task Force, April 1998, retrieved from https://www.ietforg/rfc/rfc2326.txt Fielding et al., RFC 2616: Hypertext Transfer Protocol—HTTP/1.1, June 1999, Internet Engineering Task Force, retrieved from https://www.ietforg/rfc/rfc2616.txt Klensin, RFC 2821: Simple Mail Transfer Protocol, April 2001, Internet Engineering Task Force, retrieved from https://www.ietf.org/rfc/rfc2821.txt Crispin, RFC 3501: Internet Message Access Protocol 0 Version 4rev1, March 2003, Internet Engineering Task Force, retrieved from https://www.ietforg/rfc/rfc3501.txt Sermersheim, RFC 4511: Lightweight Directory Access Protocol (LDAP): The Protocol, June 2006, Internet Engineering Task Force, retrieved from https://www.ietf.org/rfc/rfc4511.txt

Glossary

The following abbreviations are used in various parts of the disclosure, and are provided here as assistance to the reader in understanding the disclosure.

Abbreviation Meaning
C2 Command and Control
C3 Custom Command and Control
CASB Cloud Access Security Broker
FTP File Transport Protocol
FTPS File Transport Protocol Secure
HTTP HyperText Transport Protocol
HTTPS HyperText Transport Protocol Secure
GOPHER Not an abbreviation. See written description for brief discussion.
IDN International Domain Name
IETF Internet Engineering Task Force
IMAP Internet Message Access Protocol
IMAPS IMAP over SSL/TLS
IP Internet Protocol
LDAP Lightweight Directory Access Protocol
LDAPS LDAP over SSL/TLS
NSS Network Security System
OS Operating System
POP3 Post Office Protocol 3
POP3S Post Office Protocol 3 Secure
RFC Request For Comments
RTMP Real-Time Messaging Protocol
RTMPS RMTP over SSL/TLS
RTSP Real Time Streaming Protocol
SCP Secure Copy
SFTP Secure FTP
SPDY Not an abbreviation. See written description for brief discussion.
SMTP Simple Mail Transfer Protocol
SMTPS SMTP over SSL/TLS
SSL Secure Socket Layer
SSO Single Sign-On
TFTP Trivial File Transfer Protocol
TLS Transport Layer Security
UEBA User Entity Behavior Analysis
URI Uniform Resource Identifier
URL Uniform Resource Locator

BACKGROUND

The technology disclosed relates to detecting and blocking malicious command and control (C2) traffic between cloud resources and malware on an infected host. In particular, the technology relates to training a classifier to detect C2, a network security system that includes the classifier, and classifying cloud traffic using the trained classifier.

Organizations seeking to lower their IT infrastructural profile often find the cloud to be beneficial to that endeavor. Tasks and services that may have formerly required in-house maintenance have been outsourced to the cloud service providers such as Amazon, GitHub, Google, Slack, and more, requiring less maintenance and oversite by the organizations themselves. The benefits bought by the cloud to commercial organizations seeking to lower their infrastructure footprint are understood.

Unfortunately, attackers who seek to subvert organization network security have also noticed the benefits from using the cloud as outsourced infrastructure, and are joining the trend. Malicious C2 traffic is increasingly being directed to the cloud rather than to attacker-controlled infrastructure. For specific examples, see Passeri, Cloud Threats Memo: Exploiting Legitimate Cloud Services for Command and Control, published by Netskope on 14 Jan. 2022.

To preserve an organization's internet security without unduly compromising its operations, it is now necessary to both detect and curtail malicious C2 cloud traffic. This necessity poses additional challenges to detecting and blocking malicious C2 traffic that are above and beyond the challenges posed by attacker-controlled infrastructure.

As such, an opportunity arises to train a cloud traffic classifier, employ a network security system (NSS) with the classifier, classify malicious C2 traffic to cloud applications, with the aim of blocking the malicious traffic between the organization and the cloud while continuing to permit benign traffic between the organization and the cloud arises. Improved network security without overt degradation of the organization users' experiences may result.

BRIEF DESCRIPTION OF THE DRAWINGS

FIGS. 7A and 7B illustrate an example of malicious task sequence and stored comparison data.

DETAILED DESCRIPTION

Figure 1:
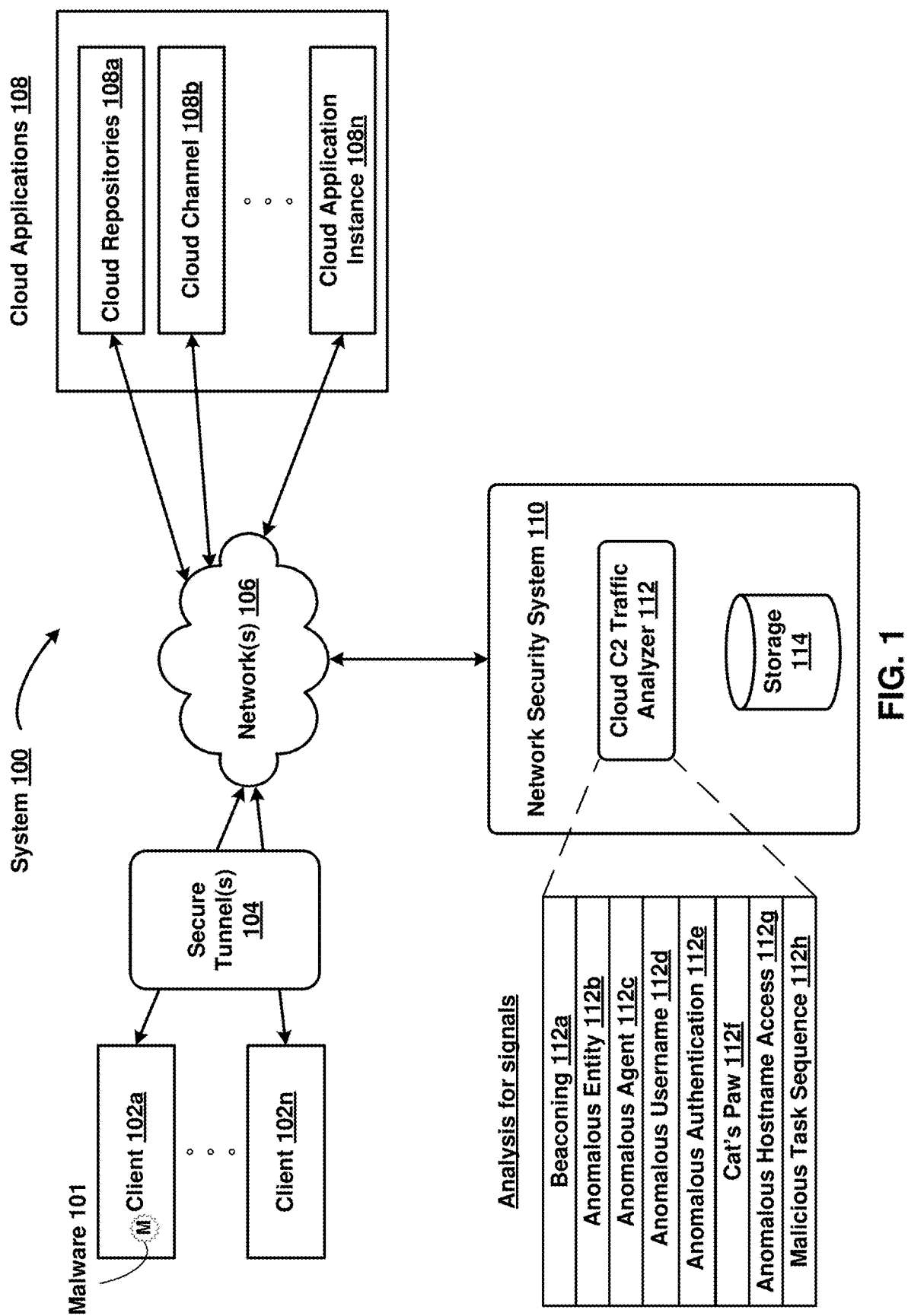
FIG. 1 illustrates a block diagram of an example environment of an NSS that detects malicious C2 cloud traffic.

The following detailed description is made with reference to the figures. Example implementations are described to illustrate the technology disclosed, and not to limit the scope defined by the claims (absent a lexicographic definition). Those of ordinary skill in the art will recognize a variety of equivalent variations on the following description.

Introduction

One challenge presented in the current state of the art is the feasibility of applying traditional remedies to C2 when malicious cloud resources are involved.

Using attacker-controlled infrastructure as a comparative example, attacker-controlled infrastructure is often legally owned or controlled by an individual or group with whom the organization has no sanctioned association. Although the individual or group may have no malice against the organization, the computing equipment of the individual or group has been compromised by an attacker (also known in the art as a "hacker"), and the individual's or group's equipment is being used by the attacker to stage attacks against the organization. In this situation, simple remedies such as DNS blocking and IP-address blocking, which blocks all traffic to and from the DNS and/or IP, are feasible because such remedies are unlikely to impose any practical cost on the organization ("We have no business with anyone at example.com, so let's just block everything from that domain.") Since malicious traffic (whether C2 or otherwise) are curtailed by these remedies, and since blocking a general domain name has a low practical cost, an organization is free to liberally employ these remedies against attacker-controlled infrastructure.

Contrasting the comparative example with cloud-controlled, an organization may have sanctioned the use of Slack channels for inter-organization communication, Amazon AWS to provide network-based services, and GitHub to collaborate on document or code development, and Google to perform literature searches and document storage. Even if unsanctioned, the employees of such an organization may have taken initiative in using similar cloud applications in ad hoc contexts to boost their productivity. As such, the costs that flow from blocking the domain name or IP addresses of even one of these cloud service providers may be impractical for the organization to bear.

An apparently simple solution is to just block the malicious C2 traffic while permitting legitimate traffic to pass through. The apparently simple solution raises another challenge: detecting malicious C2 traffic from amongst benign traffic without excessive false-positives or false-negatives. For example, it is known that beaconing behavior between an organization's client and a domain external to an organization may be evidence of malicious C2 communication. On the other hand, it may also be evidence that someone in the organization has subscribed to a periodically delivered digest from a news clipping service, or some other innocuous publish-subscribe modeled service. As such, there is a fast growing need to classify malicious C2 cloud traffic.

The present disclosure illustrates a solution to these challenges through a network security system that intercepts traffic between clients of an organization and cloud traffic, extracts features that are used to gauge whether the traffic is C2 traffic to a malicious resource on a cloud application, and if the traffic is classified as such, blocks further communication to that resource, while continuing to permit traffic to proceed.

As used herein, "malicious endpoints" are API endpoints known to be referenced by malicious software.

As used herein, "incoming requests," are requests over an organization's network that originate from clients within the network.

System Environment

An environment of the solution is described below, referring to FIG. 1. Certain details of the environment are purposefully omitted to improved clarity and focus on the technology. The components of the environment are presented first. After presenting the components, the disclosure presents how those components interact with one another.

FIG. 1 illustrates a block diagram sketching the environment of a system 100, where a network security system (NSS) 110 is deployed to detect malicious communication between a C2 cloud resource on a cloud application and malware on an infected host. System 100 includes one or more clients 102 that are part of an organization, a secure tunnel 104, a network 106, one or more cloud applications 108 that, in this implementation, include cloud storage repositories 108a, cloud communication channels 108b, and a plethora of other cloud application instances that are too numerous and varied to fully illustrate 108n. A partial list of cloud applications and entities is found in Table 1.

TABLE 1

Cloud Apps and Entities

| Cloud Application | ENTITY |
|---|---|
| Adobe Creative Cloud | library |
| Amazon EC2 | volume |
|  | ssh-keys |
| Amazon Redshift | cluster |
| AWS Lambda | function |
| Box | bookmark |
|  | web_link |
| Chrome Web Store | extension |
| Cisco Spark Message and Meet | call |
| Cisco Webex Teams | text |
| Concur | receipts |
| DocuSign | envelope |
|  | signature |
| Dropbox | sharing |
|  | logins |
|  | devices |
|  | file_requests |
|  | paper |
| enCipher.IT | link |
|  | issue |
| Figma | design file |
|  | invite |
| finddesktop.com | document |
| GitHub | deployment_status |
|  | pull_request |
|  | issues |
|  | pull request review |
|  | issue comment |
|  | pull request |
|  | pull request review comment |
|  | membership |
|  | commit status |
|  | deployment |
|  | changes |
| Google Analytics | addon |
| Google App Suite | token |
| Google Calendar | enrollment |
| Google Chat | room |
| Google Drive | mobile device |
|  | share link |
|  | public file |
|  | docs |
|  | public link |
|  | publicforms |
|  | anyone within org |
| Google Groups | groups |
| Google Hangouts | conversation |
|  | conversations |
| Google Maps | direction |
| Hub Spot | deal |
| iCloud | mail |
| iReasoning | ticket |
| iWise Service Center | case |
|  | service request |
| Marketo | forms |
| mBlox | customer |
|  | invoice |
|  | purchase order |
|  | financial statement |
|  | vendor |
| Microsoft Dynamics CRM Online | userentityuisettingsset |
|  | getfeatureenabledstate |
|  | opportunitycloses |
|  | iotcheckifrecordexistsinentity |
|  | richtextfiles |
|  | incidents |
|  | opportunityproducts |
|  | assign |
|  | fieldservicesystemaction |
|  | getsalesaccelerationconfigurationstatus |
|  | setprocess |
|  | phonecalls |
|  | surveyeventeligibility |
|  | appointments |
|  | populatecard |
|  | getceccompatibilityforomnichannel |
|  | ispaienabled |
|  | integrationsettingsread |
|  | updatemruitems |
|  | instantiatetemplate |
|  | retrieveknowledgesearchmodifiers |
|  | isadvancedunifiedroutingenabled |
|  | emails |
|  | projects |
|  | resolveincident |
|  | shouldenableroutingcommand |
|  | retrieveemailsignature |
|  | annotations |
|  | ispdfenabledforentity |
|  | quotes |
|  | opportunitysalesprocesses |
|  | opportunities |
|  | provisionlanguageforuser |
|  | activitymimeattachments |
|  | workorders |
|  | requests |
|  | documents |
|  | comments |
| Microsoft Live Outlook | members |
| Microsoft Office 365 Exchange Admin | user settings |
| Microsoft Office 365 Outlook.com | mails |
|  | body |
| Microsoft Office 365 Planner | my tasks |
|  | plan |
| Microsoft Office 365 Sharepoint Sites | owner |
|  | documentlibrary |
|  | web |
|  | sharesettings |
|  | member |
|  | collaboration |
|  | access key |
|  | device |
|  | share settings |
|  | company |
|  | site |
| Microsoft Office 365 Suite | drive |
|  | home |
| Microsoft Teams | team settings |
|  | team channels |
|  | team members |
|  | meeting call |
| monday.com | folder |
|  | idea |
|  | column |
|  | posts |
|  | note |
|  | table |
|  | item |
|  | dashboard |
|  | board |
| MySpace | status |
| Okta | tab |
| Pagerduty | schedule |
|  | incident |
| pc/MRP | task |
| Podio | application |
| point.io | video |
| Power BI | data insight |
|  | dataset |
| Rally Software | plans |
| Salesforce.com | product2 |
|  | casecomment |
|  | campaignmember |
|  | accountcontactrelation |
|  | serviceappointment |
|  | chatter conversation |
|  | contract |
|  | opportunityteammember |

TABLE 1-continued

Cloud Apps and Entities

| Cloud Application | ENTITY |
|---|---|
| | pricebook |
| | workorderlineitem |
| | knowledge_kav |
| | personlifeevent |
| | emailmessage |
| | contentnote |
| | product |
| | workorder |
| | contentversion |
| | quotelineitem |
| | outgoingemail |
| | order |
| | assignedresource |
| | customobjects |
| | livechattranscript |
| | opportunitylineitem |
| | quote |
| | custom tab |
| | contentdocument |
| | contacts |
| | location |
| | assignment |
| | accounts |
| | data |
| | diff |
| | permission set |
| securehosting.com | receipt |
| | expenses |
| ServiceNow | email |
| | field |
| Slack | chat |
| | permission |
| Slack for Enterprise | guest |
| | emoji |
| | huddle |
| | usergroup |
| SlideShare | files |
| smartfocus | message |
| | campaign |
| | leads |
| | template |
| SmartRecruiters | meeting |
| SuccessFactors | role |
| | activity |
| Survey Monkey | collector |
| | question |
| | response |
| | survey |
| syncHR | job |
| | employee benefits |
| | employee |
| | employee info |
| | employee salary |
| | workspace |
| Tableau Software | record |
| Trello | list |
| | card |
| Typetalk | topic |
| Visual Studio | release pipeline |
| | test case |
| | pipeline |
| | test point |
| | release |
| | tag |
| | query |
| | repository |
| | chart |
| | branch |
| vTiger CRM | account |
| | contact |
| | lead |
| | opportunity |
| | report |
| Weekdone | goal |
| weibo | group |
| | event |

TABLE 1-continued

Cloud Apps and Entities

| Cloud Application | ENTITY |
|---|---|
| | settings & rules |
| | team |
| | tweet |
| | webpage |
| | blog |
| | updatestatus |
| | profile |
| | messages |
| | comment |
| Windows Azure | virtual machine |
| | app service |
| | deployments |
| | secret |
| | resource group |
| | gateway |
| | virtualmachines |
| | storage account |
| | directory |
| | network interface |
| | image |
| | api |
| | service |
| | database |
| | asset |
| | workflows |
| | container |
| | workflow |
| | sites |
| | app |
| | policy |
| | queue |
| | snapshot |
| | instance |
| | connections |
| | password |
| | tags |
| Wordpress | content |
| Workday Human Capital Management | inbox |
| | expense |
| | page |
| Workplace by Facebook | attachment |
| Wrike | space |
| Xero | reports |
| Yahoo Mail | calendar |
| | draft |
| Yammer | network |
| | web link |
| | post |
| ynet | form |
| Youtube | movies |
| | music |
| | comedy |
| | film & animation |
| | sports |
| | entertainment |
| | science & technology |
| | news & politics |
| | channel |
| | pets & animals |
| | autos & vehicles |
| | gaming |
| | travel & events |
| | people & blogs |
| Zendesk | rule |
| | organization |
| | education |
| | settings |
| Zeus Traffic Manager | bucket |
| | storage unit |
| Zoho Projects | tasks |
| Zoom | installer |
| | audio |
| | screen |

TABLE 1-continued

Cloud Apps and Entities

| Cloud Application | ENTITY |
| --- | --- |
| | howto & style |
| | calendarevent |
| | nonprofits & activism |
| zulafly | user |
| zumiez | file |
| Zynstra | project |

Again, the above list is intended to demonstrate the breadth of cloud applications and cloud entities understood by persons skilled in the art, and is not intended to define a closed group. Thus, those of ordinary skill understand applications other than those expressly listed to be cloud applications in Table 1, and entities other than those listed be cloud entities in Table, will be read upon by "cloud application" and "cloud entity" based on the persons' understanding and/or by analogy to one or more entries in Table 1.

NSS 110 includes a Cloud C2 Traffic analyzer 112 that extracts features from the traffic and, as part of investigating whether various signals are present 112a-h, compares the extracted features with information in storage 114. The investigation comprises finding some of the signals of beaconing behavior 112a, anomalous entity 112b, anomalous agents 112c, anomalous username 112d, anomalous authentication 112e, whether the client exhibits a cat's paw behavior 112f, anomalous hostname access pattern 112g, and malicious task sequence 112h.

Storage 114 contains comparison information used by Cloud C2 Traffic Analyzer 112. Specific examples of stored information that may be compared against captured features of the cloud traffic (of which incoming request 202 is a part) are discussed in more detail with respect to FIGS. 3-7, below.

In the environment, the network 106 includes the Internet. The network 106 also utilizes dedicated or private communication links that are not necessarily part of the Internet. In one implementation, the network 106 uses standard communication technologies, protocols and/or inter-process communication technologies.

In the environment, clients may communicate with entities on cloud applications using protocols such as FTP, FTPS, GOPHER, HTTP, HTTPS, IMAP, IMAPS, LDAP, LDAPS, POP3, POP3S, RTMP, RTMPS, RTSP, SCP, SFTP, SMTP, SMTPS, SPDY, and TFTP.

In this environment, the clients 102a-n may individually execute respective processes which allows the client to interact with cloud applications 108. This process could be a web browser or software-client (in the server-client architecture sense of the word "client," not to be confused with any of clients 102 in FIG. 1) that is configured to interact with a particular cloud resource, or a program executing on a virtual machine, or executing via a remote desktop service. The individual clients 102a-n may be one or more devices that are, for example, a desktop computer, a laptop, tablet computer, a mobile phone, or any other type of computing device.

In this environment, at least client 102a is infected with malware 116 that is remotely controlled by an attacker (not shown). Malware 116 is controlled via a C2 channel, with one communication endpoint at client 102a itself, and the other communication endpoint at one or more resources of cloud applications 108. Malware 116 may be initiating the contact with the resource of cloud applications 108 or may be contacted by the resource on cloud application 108.

However, the contact is initiated, NSS 110 intercepts the traffic from the client and investigates via Cloud C2 Traffic Analyzer 112 to investigate a variety of C2 signals 112a-112h that may be used for classification of the cloud traffic as C2 traffic, and stores signal data into storage 114. High level details on the analysis and remedial actions are illustrated by the message sequence chart in FIG. 2.

Figure 2:
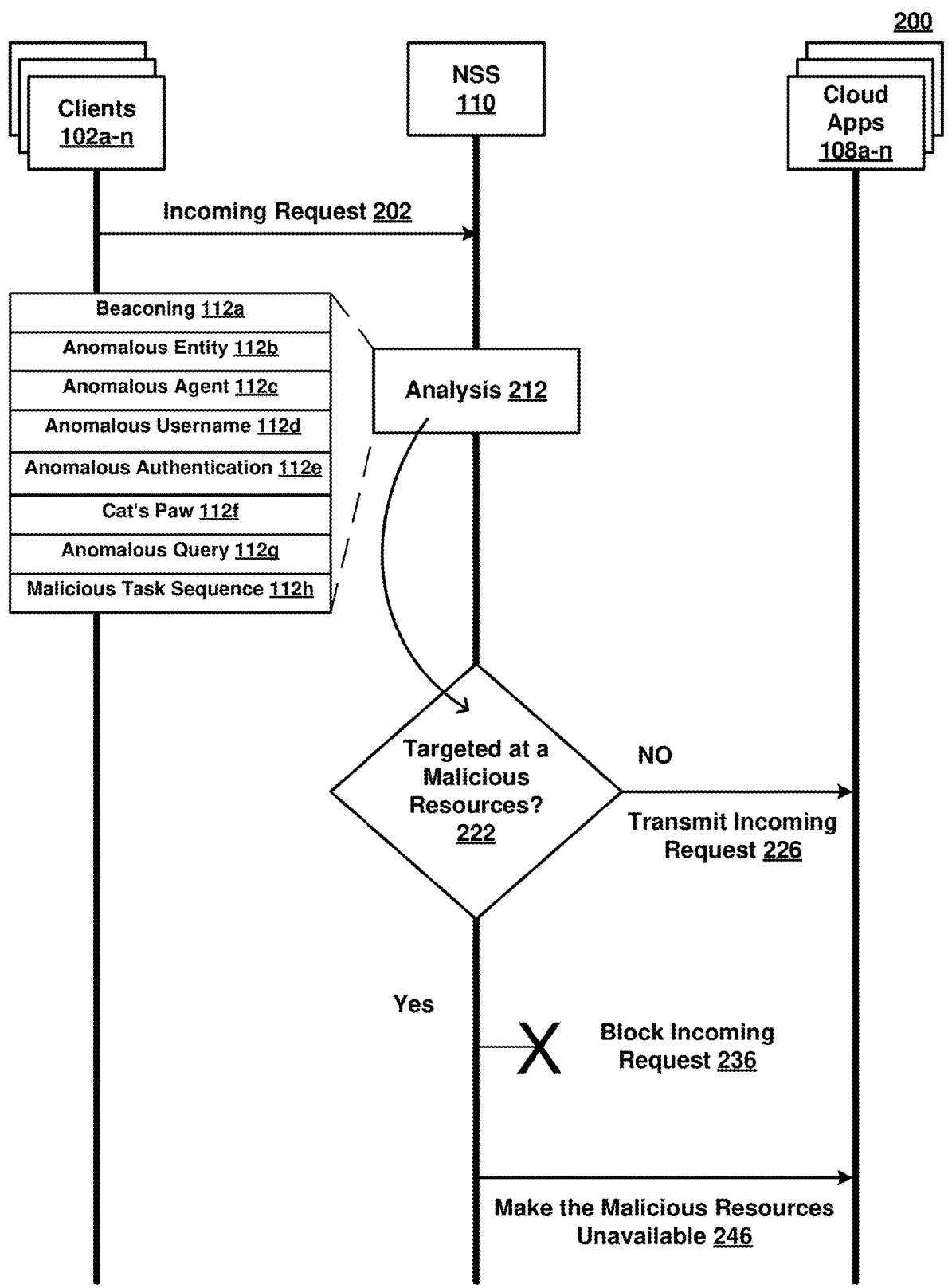
FIG. 2 illustrates a message sequence chart that describes an example of how cloud traffic is intercepted an analyzed by NSS.

FIG. 2 illustrates a message sequence chart that describes an example of how cloud traffic is intercepted and analyzed by NSS 110.

Client-originated requests 202, referred to herein as "incoming requests," originate from clients 102 and are directed towards the cloud applications 108, but are intercepted by the network security system 110 for policy enforcement.

Incoming requests 202 may encompass a variety of communications protocols (e.g., FTP, FTPS, GOPHER, HTTP, HTTPS, IMAP, IMAPS, LDAP, LDAPS, POPS, POPSS, RTMP, RTMPS, RTSP, SCP, SFTP, SMTP, SMTPS, SPDY and TFTP) that specify a Uniform Resource Identifier (URI) or URL of a resource on the cloud applications 108.

Specifically, one of clients 102a-n may provide an incoming (from the relative vantage of the NSS) request 202 that has the destination of one of the cloud applications 108a-n. NSS 110 intercepts incoming request 202 and holds that request while NSS 110 conducts analysis 212.

During analysis 212, NSS 110 extracts features from incoming request 202 and uses those features to investigate whether the cloud traffic contains signals 112a-h that suggest malicious C2 traffic that is targeted at a malicious cloud resource. As earlier stated, those signals may include beaconing behavior 112a, anomalous entity 112b, anomalous agents 112c, anomalous username 112d, anomalous authentication 112e, whether the client exhibits a cat's paw behavior 112f, anomalous hostname access pattern 112g, and malicious task sequence 112h. The features that are used to determine the signals may be drawn from data of incoming request 202 itself, or metadata about incoming request 202. Assuming, for illustrative purposes, that incoming request 202 is an HTTP request, the request may include such fields such as POST, Host, User-Agent, Content-Type, Content-Length, etc. HTTP does not provide a reflective field that expresses the complete size of the request (Content-Length provides just the body size), but that information can be obtained by sniffing traffic, thus the complete size of the request is available as metadata. To illustrate the breadth of potential features in HTTP data, a list of HTTP fields is provided in Table 2.

TABLE 2

HTTP message headers

| Header Field Name | Reference |
| --- | --- |
| Accept-Language | [RFC4021] |
| Also-Control | [RFC1849][RFC5536] |
| Alternate-Recipient | [RFC4021] |
| Approved | [RFC5536] |
| ARC-Authentication-Results | [RFC8617] |
| ARC-Message-Signature | [RFC8617] |
| ARC-Seal | [RFC8617] |
| Archive | [RFC5536] |
| Archived-At | [RFC5064] |
| Archived-At | [RFC5064] |
| Article-Names | [RFC1849][RFC5536] |
| Article-Updates | [RFC1849][RFC5536] |

TABLE 2-continued

HTTP message headers

| Header Field Name | Reference |
| --- | --- |
| Authentication-Results | [RFC8601] |
| Auto-Submitted | [RFC3834 section 5] |
| Autoforwarded | [RFC4021] |
| Autosubmitted | [RFC4021] |
| Base | [RFC1808][RFC2068 14.11] |
| Bcc | [RFC5322] |
| Body | [RFC6068] |
| Cancel-Key | [RFC8315] |
| Cancel-Lock | [RFC8315] |
| Cc | [RFC5322] |
| Comments | [RFC5322] |
| Comments | [RFC5536][RFC5322] |
| Content-Alternative | [RFC4021] |
| Content-Base | [RFC2110][RFC2557] |
| Content-Description | [RFC4021] |
| Content-Disposition | [RFC4021] |
| Content-Duration | [RFC4021] |
| Content-features | [RFC4021] |
| Content-ID | [RFC4021] |
| Content-Identifier | [RFC4021] |
| Content-Language | [RFC4021] |
| Content-Location | [RFC4021] |
| Content-MD5 | [RFC4021] |
| Content-Return | [RFC4021] |
| Content-Transfer-Encoding | [RFC4021] |
| Content-Translation-Type | [RFC8255] |
| Content-Type | [RFC4021] |
| Control | [RFC5536] |
| Conversion | [RFC4021] |
| Conversion-With-Loss | [RFC4021] |
| DL-Expansion-History | [RFC4021] |
| Date | [RFC5322] |
| Date | [RFC5536][RFC5322] |
| Date-Received | [RFC0850][RFC5536] |
| Deferred-Delivery | [RFC4021] |
| Delivery-Date | [RFC4021] |
| Discarded-X400-IPMS-Extensions | [RFC4021] |
| Discarded-X400-MTS-Extensions | [RFC4021] |
| Disclose-Recipients | [RFC4021] |
| Disposition-Notification-Options | [RFC4021] |
| Disposition-Notification-To | [RFC4021] |
| Distribution | [RFC5536] |
| DKIM-Signature | [RFC6376] |
| Downgraded-Bcc | [RFC5504][RFC6857] |
| Downgraded-Cc | [RFC5504][RFC6857] |
| Downgraded-Disposition-Notification-To | [RFC5504][RFC6857] |
| Downgraded-Final-Recipient | [RFC6857 Section 3.1.10] |
| Downgraded-From | [RFC5504][RFC6857 Section 3.1.10] |
| Downgraded-In-Reply-To | [RFC6857 Section 3.1.10] |
| Downgraded-Mail-From | [RFC5504][RFC6857 Section 3.1.10] |
| Downgraded-Message-Id | [RFC6857 Section 3.1.10] |
| Downgraded-Original-Recipient | [RFC6857 Section 3.1.10] |
| Downgraded-Rcpt-To | [RFC5504][RFC6857] |
| Downgraded-References | [RFC6857 Section 3.1.10] |
| Downgraded-Reply-To | [RFC5504][RFC6857] |
| Downgraded-Resent-Bcc | [RFC5504][RFC6857] |
| Downgraded-Resent-Cc | [RFC5504][RFC6857] |
| Downgraded-Resent-From | [RFC5504][RFC6857] |
| Downgraded-Resent-Reply-To | [RFC5504][RFC6857] |
| Downgraded-Resent-Sender | [RFC5504][RFC6857] |
| Downgraded-Resent-To | [RFC5504][RFC6857] |
| Downgraded-Return-Path | [RFC5504][RFC6857] |
| Downgraded-Sender | [RFC5504][RFC6857] |
| Downgraded-To | [RFC5504][RFC6857] |
| Encoding | [RFC4021] |
| Encrypted | [RFC4021] |
| Expires | [RFC4021] |
| Expires | [RFC5536] |
| Expiry-Date | [RFC4021] |
| Followup-To | [RFC5536] |
| From | [RFC5322][RFC6854] |
| From | [RFC5536][RFC5322] |
| Generate-Delivery-Report | [RFC4021] |
| Importance | [RFC4021] |
| In-Reply-To | [RFC5322] |
| Incomplete-Copy | [RFC4021] |
| Injection-Date | [RFC5536] |
| Injection-Info | [RFC5536] |
| Keywords | [RFC5322] |
| Keywords | [RFC5536][RFC5322] |
| Language | [RFC4021] |
| Latest-Delivery-Time | [RFC4021] |
| Lines | [RFC5536][RFC3977] |
| List-Archive | [RFC4021] |
| List-Help | [RFC4021] |
| List-ID | [RFC4021] |
| List-Owner | [RFC4021] |
| List-Post | [RFC4021] |
| List-Subscribe | [RFC4021] |
| List-Unsubscribe | [RFC4021] |
| List-Unsubscribe-Post | [RFC8058] |
| Message-Context | [RFC4021] |
| Message-ID | [RFC5322] |
| Message-ID | [RFC5536][RFC5322] |
| Message-Type | [RFC4021] |
| MIME-Version | [RFC4021] |
| MMHS-Exempted-Address | [RFC6477][ACP123 Appendix A1.1 and Appendix B.105] |
| MMHS-Extended-Authorisation-Info | [RFC6477][ACP123 Appendix A1.2 and Appendix B.106] |
| MMHS-Subject-Indicator-Codes | [RFC6477][ACP123 Appendix A1.3 and Appendix B.107] |
| MMHS-Handling-Instructions | [RFC6477][ACP123 Appendix A1.4 and Appendix B.108] |
| MMHS-Message-Instructions | [RFC6477][ACP123 Appendix A1.5 and Appendix B.109] |
| MMHS-Codress-Message-Indicator | [RFC6477][ACP123 Appendix A1.6 and Appendix B.110] |
| MMHS-Originator-Reference | [RFC6477][ACP123 Appendix A1.7 and Appendix B.111] |
| MMHS-Primary-Precedence | [RFC6477][ACP123 Appendix A1.8 and Appendix B.101] |
| MMHS-Copy-Precedence | [RFC6477][ACP123 Appendix A1.9 and Appendix B.102] |
| MMHS-Message-Type | [RFC6477][ACP123 Appendix A1.10 and Appendix B.103] |
| MMHS-Other-Recipients-Indicator-To | [RFC6477][ACP123 Appendix A1.12 and Appendix B.113] |
| MMHS-Other-Recipients-Indicator-CC | [RFC6477][ACP123 Appendix A1.12 and Appendix B.113] |
| MMHS-Acp127-Message-Identifier | [RFC6477][ACP123 Appendix A1.14 and Appendix B.116] |
| MMHS-Originator-PLAD | [RFC6477][ACP123 Appendix A1.15 and Appendix B.117] |
| MT-Priority | [RFC6758] |
| Newsgroups | [RFC5536] |
| NNTP-Posting-Date | [RFC5536] |
| NNTP-Posting-Host | [RFC2980][RFC5536] |
| Obsoletes | [RFC4021] |
| Organization | [RFC7681] |
| Organization | [RFC5536] |
| Original-Encoded-Information-Types | [RFC4021] |
| Original-From | [RFC5703] |
| Original-Message-ID | [RFC4021] |
| Original-Recipient | [RFC3798][RFC5337] |
| Original-Sender | [RFC5537] |
| Originator-Return-Address | [RFC4021] |
| Original-Subject | [RFC5703] |
| Path | [RFC5536] |
| PICS-Label | [RFC4021] |
| Posting-Version | [RFC0850][RFC5536] |
| Prevent-NonDelivery-Report | [RFC4021] |
| Priority | [RFC4021] |
| Received | [RFC5322][RFC5321] |
| Received-SPF | [RFC7208] |
| References | [RFC5322] |
| References | [RFC5536][RFC5322] |
| Relay-Version | [RFC0850][RFC5536] |
| Reply-By | [RFC4021] |
| Reply-To | [RFC5322] |

TABLE 2-continued

HTTP message headers

| Header Field Name | Reference |
|---|---|
| Reply-To | [RFC5536][RFC5322] |
| Require-Recipient-Valid-Since | [RFC7293] |
| Resent-Bcc | [RFC5322] |
| Resent-Cc | [RFC5322] |
| Resent-Date | [RFC5322] |
| Resent-From | [RFC5322][RFC6854] |
| Resent-Message-ID | [RFC5322] |
| Resent-Reply-To | [RFC5322] |
| Resent-Sender | [RFC5322][RFC6854] |
| Resent-To | [RFC5322] |
| Return-Path | [RFC5322] |
| See-Also | [RFC1849][RFC5536] |
| Sender | [RFC5322][RFC6854] |
| Sender | [RFC5536][RFC5322] |
| Sensitivity | [RFC4021] |
| Solicitation | [RFC3865] |
| Subject | [RFC5322] |
| Subject | [RFC5536][RFC5322] |
| Summary | [RFC5536] |
| Supersedes | [RFC4021] |
| Supersedes | [RFC5536][RFC2156] |
| TLS-Report-Domain | [RFC8460] |
| TLS-Report-Submitter | [RFC8460] |
| TLS-Required | [RFC8689] |
| To | [RFC5322] |
| User-Agent | [RFC5536][RFC2616] |
| VBR-Info | [RFC5518] |
| X400-Content-Identifier | [RFC4021] |
| X400-Content-Return | [RFC4021] |
| X400-Content-Type | [RFC4021] |
| X400-MTS-Identifier | [RFC4021] |
| X400-Originator | [RFC4021] |
| X400-Received | [RFC4021] |
| X400-Recipients | [RFC4021] |
| X400-Trace | [RFC4021] |

HTTP request methods that can be intercepted and analyzed by NSS 110 include, but are not limited to, GET, HEAD, POST, PUT, DELETE, CONNECT, OPTIONS, TRACE, AND PATCH. Additional information about HTTP/HTTPS request methods can be found in RFC 2616 Chapter 9. The entirety of RFC 2616 is incorporated by reference.

The detailed example of HTTP features should not be considered as limiting the scope of the disclosed technology as only intercepting data used over HTTP. For example, an alternative protocol to the HTTP and its variants includes the GOPHER protocol which was an earlier content delivery protocol but was displaced by HTTP in 1990s. Another HTTP alternative is the SPDY protocol which was developed by Google and now superseded by HTTP/2. Other communication protocols which may support applications incorporating the use of the disclosed synthetic request-response mechanism include but not be limited to, e.g., FTP, FTPS, IMAP, IMAPS, LDAP, LDAPS, POPS, POP3S, RTMP, RTMPS, RTSP, SCP, SFTP, SMTP, SMTPS, and TFTP.

The communication protocols used to exchange files between computers on the Internet or a private network and implementable by the disclosed synthetic request-response mechanism include the FTP (File Transfer Protocol), FTPS (File Transfer Protocol Secure) and SFTP (SSH File Transfer Protocol). FTPS is also known as FTP-SSL. FTP Secure is an extension to the commonly used FTP that adds support for the TLS (Transport Layer Security), and formerly the SSL (Secure Socket Layer). The SSH File Transfer Protocol (i.e., SFTP, also Secure File Transfer Protocol) is an extension of the secure shell (SSH) protocol that provides secure file transfer capabilities and is implementable by the disclosed synthetic request-response mechanism.

Another file transfer protocol, secure copy protocol (SCP) is a means of securely transferring electronic files between a local host and a remote host or between remote hosts and is implementable by the disclosed synthetic request-response mechanism. A client can send (upload) file to a server, optionally including their basic attributes (e.g., permissions, timestamps). A client can also request files or directories from a server (download). Like SFTP, SCP is also based on the Secure Shell (SSH) protocol that the application server has already authenticated the client and the identity of the client user is available to the protocol. SCP is however outdated and inflexible such that the more modern protocol like SFTP is recommended for file transfer and is implementable by the disclosed synthetic request-response mechanism.

FTP and the like provide commands which, similar to the HTTP request methods, can be used by the network security system 104 to transmit the synthetic requests include ACCT, ADAT, AUTH, CSID, DELE, EPRT, HOST, OPTS, QUIT, REST, SITE, XSEM. Additional information about FTP commands can be found in RFC 959 chapter 4. RFC 959 is incorporated by reference in its entirety.

A simple and lightweight file transfer protocol, Trivial File Transfer Protocol (TFTP) allows clients to get a file from or put a file onto a remote host which is typically embedded device retrieving firmware, configuration, or a system image during a boot process for a tftp server. In TFTP, a transfer is initiated by issuing a client (tftp) which issues a request to read or write a file on the server. The client request can optionally include a set of parameters proposed by the client to negotiate the transfer. The tftp commands vary by platform. As example, a list of TFTP commands for OpenBSD may be found in the "man page" tftp(1), published on May 1, 2012, a copy of which is incorporated by reference in its entirety.

The communication protocols used for retrieving email (i.e., electronic mail) messages from a mail server include the IMAP (Internet Message Access Protocol), IMAPS (secure IMAP over the TLS or former SSL to cryptographically protect IMAP connections) as well as the earlier POP3 (Post Office Protocol) and the secure variant POPSS. In addition to IMAP and POP3 which are the prevalent standard protocols for retrieving messages, other email protocols implemented for proprietary servers include the SMTP (Simple Mail Transfer Protocol). Like HTTP and FTP protocols, email protocols such as IMAP, POP3 and SMTP are based on the client-server model over a reliable data stream channel, typically a TCP connection. An email retrieval session such as a SMTP session including 0 or more SMTP transactions consists of commands originated by a SMTP client and corresponding responses from the SMTP server, so that the session is opened, and parameters are exchanged.

Like file transfer protocols, email protocols provide commands which, similar to the HTTP request methods, can be used by the network security system 104 to transmit the synthetic requests. Examples of the text-based commands include HELO, MAIL, RCPT, DATA, NOOP, RSET, SEND, VRFY and QUIT for SMTP protocol, and commonly used commands like USER, PASS, STAT, LIST RETR, DELE, RSET, TOP and QUIT for POP3 protocol. Additional information about email protocol commands can be found at RFC 2821, Chapter 4; RFC 3501, Chapter 6; RFC 1939, Chapters 4-7. Each of RFC 2821, RFC 3501, and RFC 1939 are incorporated by reference in their entirety.

Another communication protocol which may support synthetic request-response paradigm is the Lightweight Directory Access Protocol (LDAP) and its secure variant LDAPS (i.e., LDAP over SSL). This communication protocol is an open, vendor neutral, industry standard application protocol for accessing and maintaining distributed directory information services over Internet network. A client starts an LDAP session by connecting to a LDAP server over a TCP/IP connection. The client then sends an operation request to the server which in turn sends a response in return. Analogous to HTTP request methods and FTP commands, a LDAP client may request from server the following operations: Bind, Search, Compare, Add, Delete, Modify, Modify DN, Unbind, Abandon, and Extended. Additional information about the LDAP protocol can be found at RFC 4511, which is incorporated by reference in its entirety.

Real-Time Streaming Protocol (RTSP), Real-Time Messaging Protocol (RTMP) and its secure variant RTMPS (RTMP over TLS/SSL) are some proprietary protocols for real-time streaming audio, video and data over the Internet network that are implementable by the disclosed synthetic request-response mechanism. For example, the RTSP protocol is used for establishing and controlling media sessions between two endpoints. Similar in some ways to HTTP, RSTP defines control sequences (referred as commands, requests or protocol directives) useful in controlling multimedia playback. Clients of media server issue RTMP requests, such as PLAY, RECORD and PAUSE to facilitate real-time control of streaming from a client to a server (Voice Recording), while some commands travel from a server to a client (Video on Demand). Some typical HTTP requests, e.g., the OPTIONS request, are also available in RSTP and are implementable by the disclosed synthetic request-response mechanism. Additional information about RTSP may be found from RFC 2326, chapter 10. The entirety of RFC 2326 is incorporated by reference. Additional information about RTMP may be found from Parmar et al., Adobe's Real Time Messaging Protocol, the entirety of which is incorporated by reference.

Once features are extracted from the data and/or metadata of incoming request 202, NSS 110 investigates which signals are present 112*a-h*. A determination that one of the signals is present is not mutually exclusive from a determination that another signal is present. E.g., the presence of beaconing behavior in incoming request 202 neither requires nor precludes that incoming request 202 is en route to an anomalous entity.

Based on analysis 212 regarding the presence or absence of signals, NSS 110 classifies whether or not incoming request 202 is targeted to a malicious cloud application resource 222.

When a resource is likely to be benign, NSS 110 keeps the resource available for the organization, and releases the hold on incoming request 202 by transmitting the request 226. On the other hand, when a resource is determined to be likely malicious, NSS 110 blocks incoming request 202 from transmission 236 and further makes the malicious resources unavailable to users in the organization either by way of quarantine 246*a* (i.e. isolating data in one of the cloud resources 108 when the organization has control over the malicious resource) and/or blacklist 246*b* (i.e. preventing access to the cloud resource as a whole when the organization does not have control over the cloud resource).

Having discussed the environment and operation of NSS 110 at a high level, the following sections discuss determinations, by Cloud C2 Traffic Analyzer 112, of the presences or absence of each signal in FIGS. 3-6. For convenience, actions or steps are described as being performed by NSS 110.

Beaconing Behavior

Figure 3:
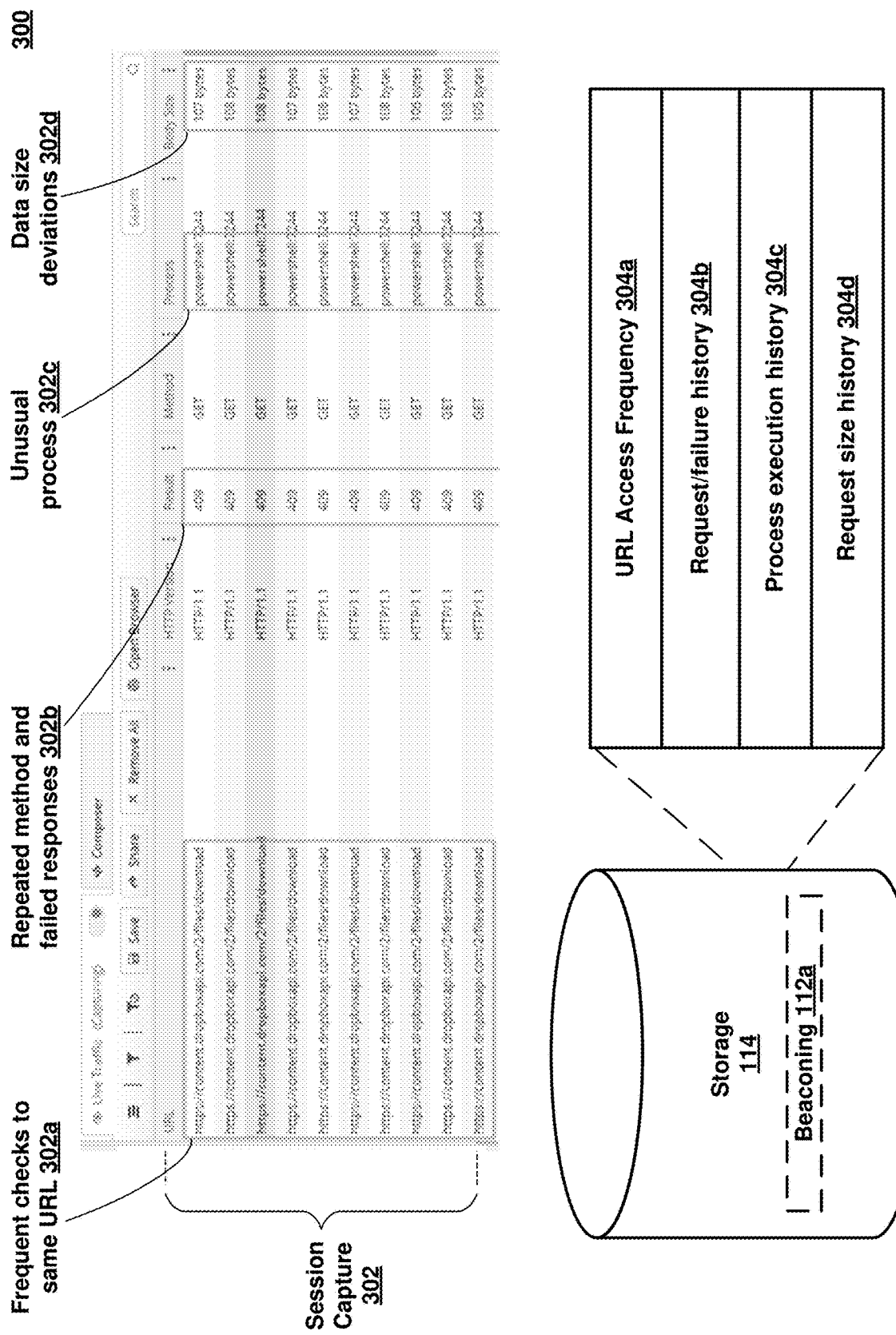
FIG. 3 illustrates an example of beaconing from the incoming request and stored comparison data.

FIG. 3 illustrates an example of beaconing behavior and stored comparison data.

As a reminder, this figure follows the environment and scenario of FIG. 1. The use of HTTP as the source of features and the data stored in storage 114 should not treated as limiting the claims, unless the claims themselves expressly limits those aspects. Rather, FIG. 3 is presented here to illustrate a real example of how beaconing can be detected by NSS 110, and beaconing may be determined by NSS 110 using other protocols by following the spirit the disclosure here.

C2 beaconing is a periodic check-in by malware 116 with a resource on one of cloud applications 108, for obtaining further instructions from an attacker. The attacker may leave instructions to perform espionage to obtain the organization's sensitive data, exfiltrate that sensitive data, sabotage of an organization's projects or infrastructure, and the like.

In an example, Cloud C2 Traffic Analyzer 112 in NSS 110 investigates whether beaconing behavior is present 112*a* in HTTP traffic to a cloud application 108 by causing NSS 110 to capture the communication session in session capture 302. NSS 110 extracts features such as frequency of checks to the same URL 302*a*, repeated HTTP GET attempts and failures 302*b*, unusual process 302*c*, and variance of data sizes 302*d*.

In this example, storage 114 contains URL access frequency 304*a*, request/failure history 304*b*, process execution history 304*c*, and request size history 304*d*.

URL access frequency 304*a* enables NSS 110 to count the frequency of access of a given URL by a client. Access frequency may an access rate over time, against a threshold set by a user, a threshold set by machine learning, or a spike in access requests relative to a period of time, a spike in the client owned by a user relative to clients owned by other users with similar role as the user, or other manners of determining that the URL is frequently accessed.

Query transmission history 304*b* enables NSS 110 to track repeated requests and repeated failures of those requests to the same URL. A few occurrences may be happenstance, but where repeated HTTP GET attempts and failures occur, that repetition may suggest malware action. Whether a cycle of request and failures is critical may be determined against a threshold number of cycles, or by some threshold deviation from normal behavior. Repeated, periodic, access attempts to the same URL may also noted by NSS 110.

Process execution history 304*c* tracks which process initiated the checks to the URL and enables NSS 110 to determine whether the process is typical of one that initiates HTTP requests from the organization. In some examples, NSS 110 may determine that the process has not been historically used to access a resource on one of cloud applications 108 and is thus anomalous. In other examples, atypical processes can also include obsolete, shelved, and/or infrequently-used web browsing applications. Consider the example of now-obsolete Microsoft's Internet Explorer (IE) web browser that has been replaced by Microsoft's Edge web browser; although IE was once the most popularly used web browser, it's continued use in current context might indicate an atypical process.

Request size history 304*d* enables NSS 110 to determine the deviation sizes of the HTTP request body. Deviation may be determined using statistical methods e.g., a determination to fall within standard deviation from a median request body size. Other examples of determination may be a set range. In some implementations, the range may be within 1 KB of a mean value. In some implementations, the range may be 10 bytes. In some implementations, the sizes may be identical.

After analysis of the extracted features is complete, NSS 110 detects whether beaconing behavior has occurred.

Anomalies

Figure 4A:
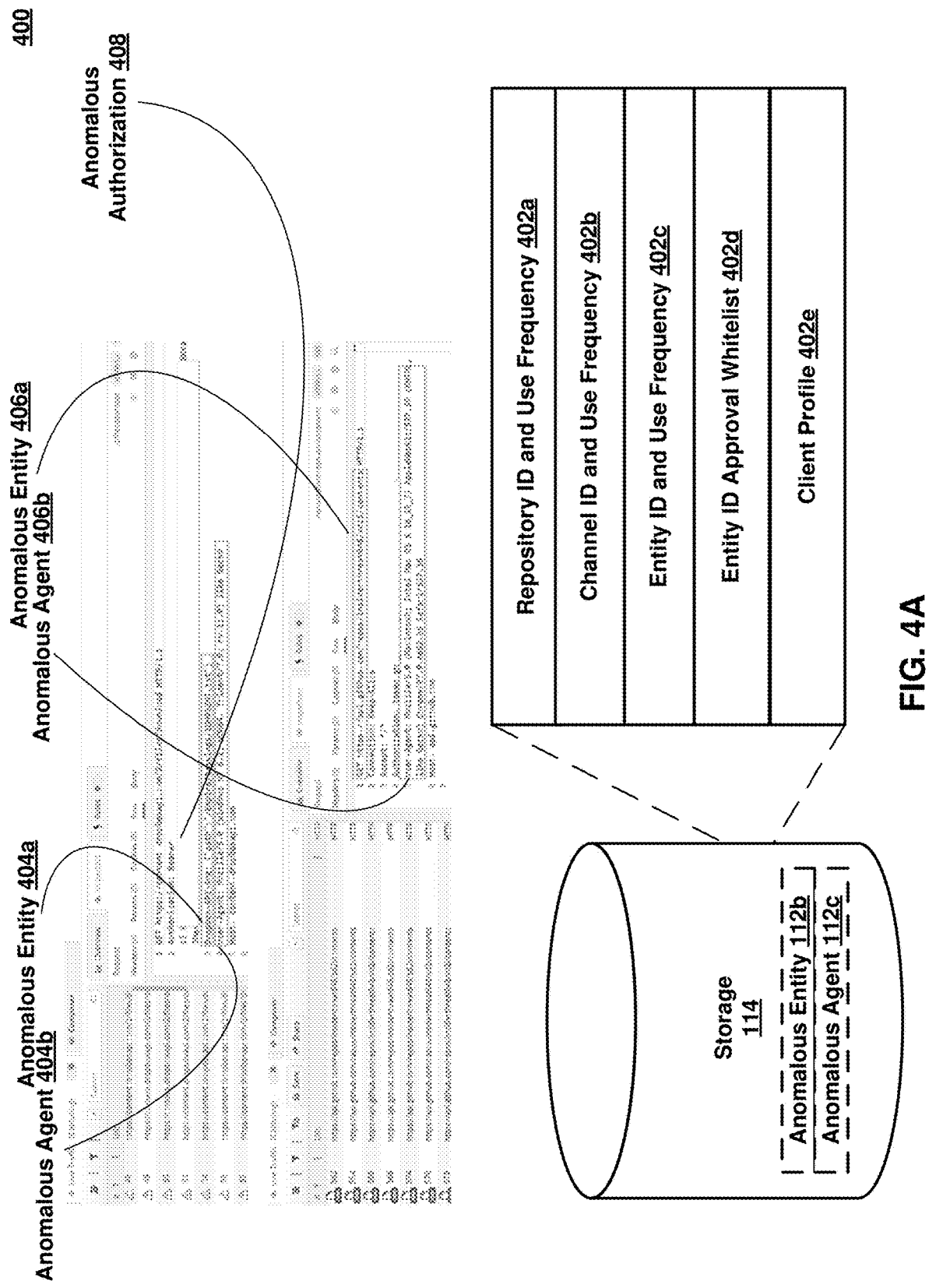
FIGS. 4A and 4B illustrates an example of anomalies that may provide evidence of malicious C2 Cloud Traffic and stored comparison data.
Figure 4B:
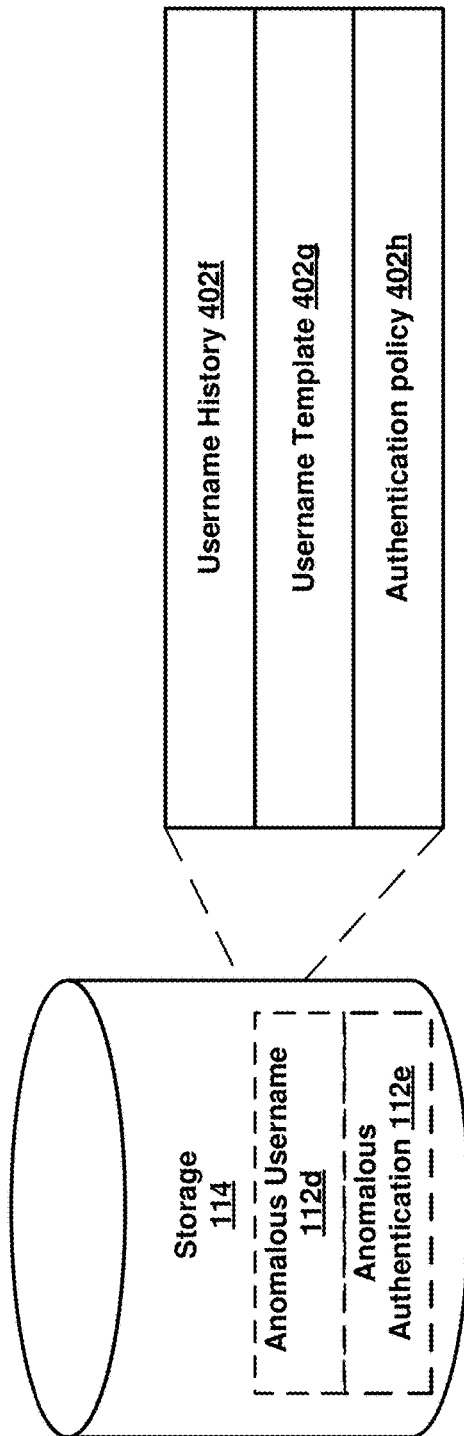

FIGS. 4A and 4B illustrate an example of anomalies from the incoming request and stored comparison data.

As a reminder, this figure follows the environment and scenario of FIG. 1, so the use of HTTP as the source of features and the data that is being stored in storage 114 should not treated as limiting the claim unless the claim itself expressly claims those aspects. Rather, FIGS. 4A and 4B are presented here to illustrate a real example of how anomalous entities, anomalous agents, anomalous usernames, and anomalous authentication can be detected by the NSS 110; anomalous entities and agents may be detected from other protocols by following the spirit the disclosure.

In particular, FIG. 4A illustrates an example of features extracted from incoming request 202 from and comparison data stored in storage 114 to analyze whether anomalous entity or agent data is present 112b, 112c in incoming request 202.

In the example, Cloud C2 Traffic Analyzer 112 in NSS 110 analyzes whether anomalous entities 112b are present in two HTTP GET requests to a cloud application 108 by causing NSS 110 extract features such as entity field 404a, 406a.

Storage 114 contains information that the extracted features may be evaluated against. In this example, storage 114 contains ID and use frequency of the cloud application resources provided above, in the discussion of FIG. 1.

Repository ID and use frequency enables NSS 110 to determine if a repository 108a that a client 102 is attempting to access is an anomalous entity. Examples of cloud entities that could be anomalous encompass, repositories 108a, channels 108b, or any other type of cloud entity known to those skilled in the art 108n, non-limiting examples of which are provided in Table 1.

One manner of determining if a cloud entity is anomalous is to determine the aggregate usage frequency as compared to other cloud entities. Using for example, using GitHub as a representative data repository, the frequency that a particular GitHub repository is accessed may be compared against the access frequencies of other GitHub repositories by way of repository ID and use frequency 402a. Where the variance in repository access frequencies is known, and assuming the access frequencies are normally distributed, the aggregate usage frequency to the cloud entity may be determined to be significantly less or significantly more than the mean. Of course, the z-test is not the only evaluation that may be used to determine to evaluate access frequency, and those skilled in the art would apply appropriate evaluation techniques based on the organization's particular circumstances (e.g., A smaller pool of observations might suggest a t-test is more appropriate. Regression analysis may be appropriate if the organization's cloud resource access patterns change often. If the organization's has historically stable access patterns, just finding that the frequency is less than a threshold value).

Likewise, using Slack as a representative cloud chat application, channel ID and use frequency 402b enables NSS 110 to determine if a Slack channel that client 102 is attempting to access is an anomalous channel, and in general, storage 114 may contain entity repository ID and use frequency 402c for particular cloud application resources enables NSS 110 to determine if cloud entity 108n that a client 102 is attempting to access is an anomalous entity. Additionally and/or alternatively, classes of cloud application resources (e.g., Discord, IRC, Google Chat) might all be considered as a class of communication channels along with Slack) might also be considered as an anomaly if an organization or user typically does not access such class of cloud resource. Again, a non-exhaustive list of cloud entities is provided in Table 1, and one of ordinary skill in the art could ascertain other cloud entities that could carry malicious commands based on those non-limiting examples, without listing each specific entity.

In this example, entity ID and approval whitelist 404 enables NSS 110 to determine if an entity is sanctioned or unsanctioned by the organization. When entities that the incoming request is attempting to access are not recorded on the whitelist, that may provide some evidence that the entity is anomalous.

After analysis of the extracted features is complete, Cloud C2Traffic Analyzer 112 detects whether the signal of anomalous entity is a target of incoming request 202.

In an example, Cloud C2 Traffic Analyzer 112 in NSS 110 investigates whether anomalous agents 112c are present in two HTTP GET requests to a cloud application 108 by causing NSS 110 extract features such as User Agent fields 404b, 406b.

In this example, Storage 114 contains information that the extracted features may be evaluated against such as client profile 402e.

In some HTTP messages, User Agent fields identify information such as web browser product name, web browser version number, and OS. By comparing User Agent fields 404b, 406b against a client profile 402e, NSS 110 may be able to find evidence that the agent information is atypical with respect to the organization (e.g., the organization uses Microsoft Edge and the agent purports to be executing in Microsoft Internet Explorer), that the agent is associated with known malicious activity, or that the agent executes at a frequency that is less than typical for agents (e.g., users use Microsoft Edge for most browsing, and Microsoft Internet Explorer is only used once a day, at 2 am).

After analysis of the extracted features is complete, Cloud C2Traffic Analyzer 112 detects whether the signal of anomalous agent is provided in the incoming request 202.

In particular, FIG. 4B illustrates an example of features extracted from incoming request 202 and comparison data stored in storage 114 to investigate whether anomalous usernames or authentication methods are present in incoming request 202.

In an example, Cloud C2 Traffic Analyzer 112 in NSS 110 investigates whether anomalous username is present 112d in HTTP traffic to a cloud application 108. NSS 110 extracts features such as username from incoming request 202.

In the example, storage 114 contains information that the extracted features may be evaluated against such as username history 402f and username template 402g.

Username history 402f enables NSS 110 to determine if a username has been used to access a cloud resource in the past. If a username is being used to access a cloud resource that was not accessed in the past, and is recently being accessed, that may provide evidence of access to a malicious cloud resource.

Additionally or alternatively, username template 402g enables NSS 110 to determine if the username adheres to a template. The template could be a static list, or could be dynamically defined via a regular expression or some other linguistic production rule. If NSS 110 encounters the following access attempts—username: dagmulugeta1, from username: raycanzanese1, from username: colestep2, from username: imhax0r, and from username: siyyang1, comparison of the usernames to a regular expression defining first three letters of the given name+the full family name+ending digit would indicate that the fourth name is anomalous. The request with the anomalous username could be identified, and thus potential data loss prevented, even if a HTTP request history had not been established in 402f.

After investigation of the extracted features is complete, Cloud C2Traffic Analyzer 112 determines whether the signal of anomalous username is provided in the incoming request 202.

In an example, Cloud C2 Traffic Analyzer 112 in NSS 110 investigates whether anomalous authentication is present 112e in HTTP traffic to a cloud application 108. NSS 110 extracts features such as the authentication field 408 from incoming request 202.

In the example, storage 114 contains an authentication policy 402h. Authentication policy 402h enables NSS 110 to determine if an authentication attempt is anomalous. Authentication policy 402h records the organization's authentication policies.

Investigating for anomalous authentication may involve comparison between authentication 408 of incoming request 202 and authentication policy 402h. If authentication policy 402h indicates that the organization's policy is to use a basic or digest authentication scheme rather than a bearer token scheme, that different may suggest the signal of anomalous authentication scheme is being used.

In another approach, if the organization in general uses SSO and incoming request 202 uses a username/password combination, this could also be anomalous.

After analysis of the extracted features is complete, Cloud C2Traffic Analyzer 112 detects whether the signal of anomalous authentication is provided in incoming request 202.

Cat's Paw

Figure 5A:
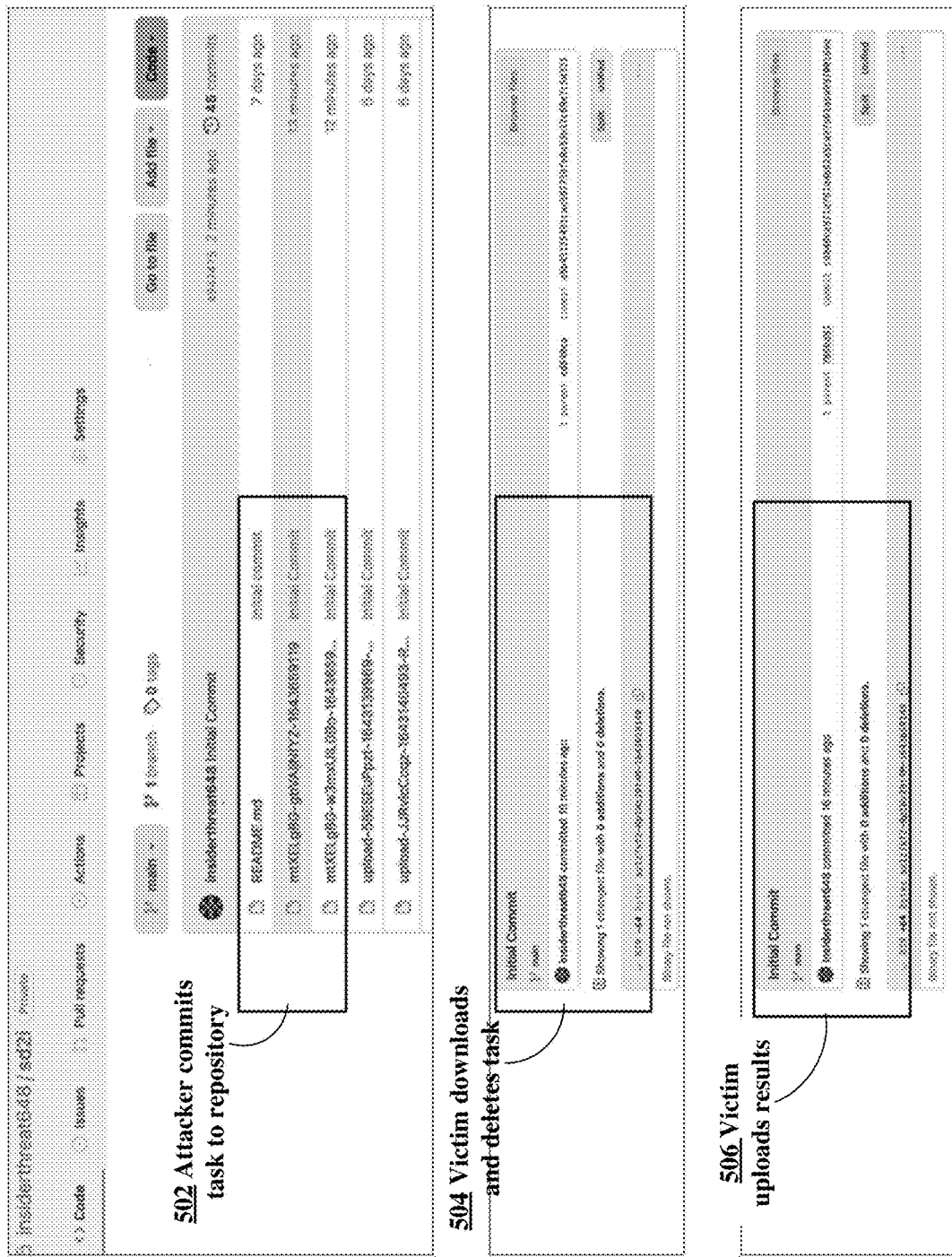
FIGS. 5A and 5B illustrate an example of cat's paw behavior by the client and stored comparison data.

FIGS. 5A and 6B illustrate an example of cat's paw behavior by the client and stored comparison data.

Figure 5B:
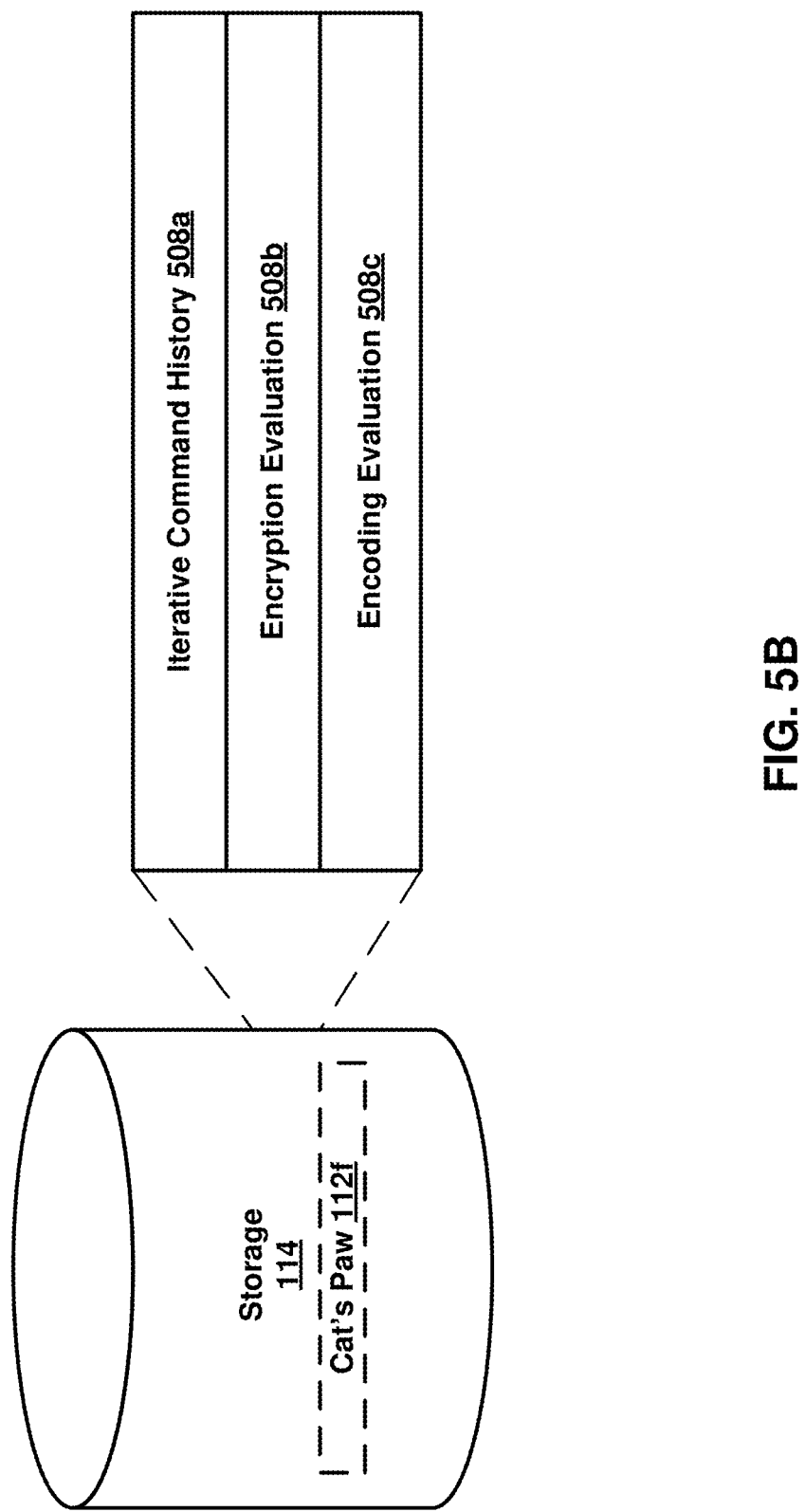

As a reminder, this figure follows the environment and scenario of FIG. 1, so the use of GitHub as the source of features and the data that is being stored in storage 114 should not treated as limiting the claim unless the claim itself expressly claims those aspects. Rather, FIGS. 5A and 5B are presented here to illustrate a real example of how the NSS 110 detects that the client serves as a cat's paw to an entity external to the organization. Other protocols and other stored data being used for the investigation may be employed without departing from the spirit of the disclosure.

The term "cat's paw" is a popular idiom in English and French that refers to a person who unwittingly induced to acts to the benefit of another. In this case, interaction by client 102a with cloud resources may exhibit behaviors or properties that suggest that it is acting on behalf of a malicious outsider, via malware 116.

In particular, FIG. 5A illustrates an example of features extracted from incoming request 202 to investigate cat's paw behavior 112f.

In the example, an attacker commits a task to a GitHub repository 502. The repository is a private repository called sd2i. The victim client 102a that is infected by malware 116 downloads and deletes 504 the task from the repository in step 504. In the example, step 504 shows the line "BIN −64 Bytes az1z7kf2-Rp1Wz29t4M-1643659148". The victim them uploads a result in step 506. In the example, step 506 shows the line "BIN+64 Bytes az1z7kf2-Rp1Wz29t4M-1643659148." The difference between the two lines (−64 as opposed to +64) shows that data has been deleted during 504, and added in 506.

The example discussed here is just one iteration. Deleting and adding data to a GitHub repository across different commits may be happenstance. But over time, multiple iterations are recorded as cycles of download-delete-upload by the client. Where repeated upload-download cycles (or upload-delete-download, where the delete operation is used in an attempt to avoid computer forensics) occur, the behavior may be evidence suggesting that the client is being induced to perform activity based on external communication, and is reporting the result of external control or exfiltrating data. Additional evidence of reporting or exfiltrating may occur when the data being uploaded is determined to be encrypted or encoded by a compression algorithm in an attempt to avoid inspection of the data content.

In particular, FIG. 5B illustrates an example of stored data that is compared against the features extracted from the incoming request 202 from to investigate cat's paw behavior 112f.

In the example, storage 114 contains information that the extracted features may be evaluated against such as iterative command history 508a and encryption evaluation 508b, and encoding evaluation 508c.

Iterative command history 508a enables NSS 110 to determine whether iterations of commands (e.g. iterations of download-delete-upload) performed by the client from cloud resources. Iterative command history 508a could be extracted from a log of commands with respect to the cloud resource, or could be a recorded count of command patterns known to be malicious to the cloud resource, or other information known in the art.

Encryption evaluation 508b and encoding evaluation 508c record data enables NSS 110 to investigate whether a file is encrypted or encoded. Encryption evaluation could be, for example, a measure of entropy, character distribution, mean value or other measure of randomness, while encoding evaluation could be regular expressions that conform to known headers. Additionally and/or alternatively, the encryption evaluation 508b and 508c can be conclusions made by other software modules such as other modules as may be published by Netskope or $3^{rd}$ party modules such as Microfocus's KeyView.

After analysis of the extracted features is complete, Cloud C2Traffic Analyzer 112 detects whether the signal of anomalous username is provided in the incoming request 202.

Anomalous Hostname Access Patterns

Figure 6:
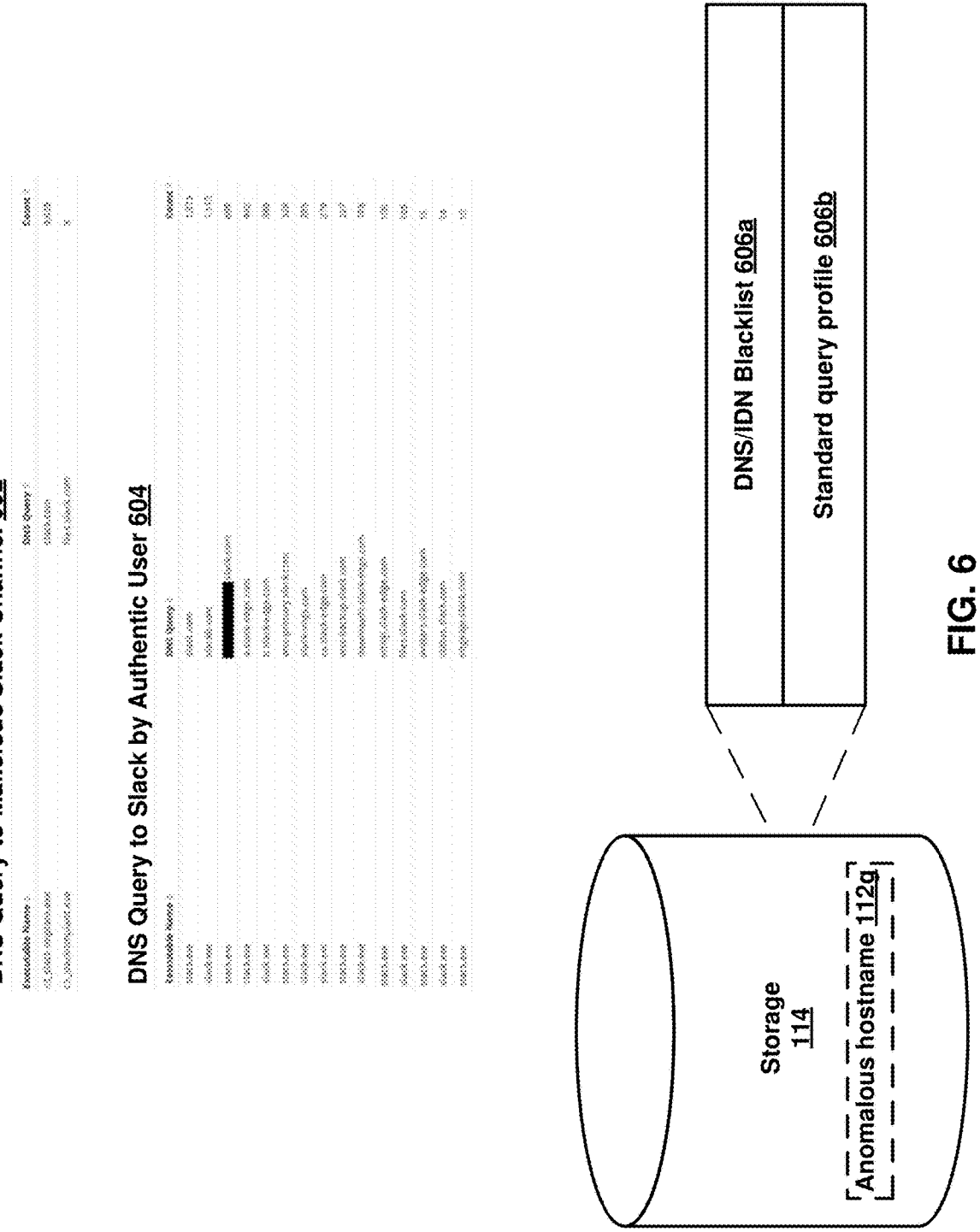
FIG. 6 illustrates an example of an anomalous hostname access patterns and stored comparison data.

FIG. 6 illustrates an example of an anomalous hostname access patterns and stored comparison data.

As a reminder, this figure follows the environment and scenario of FIG. 1, so the investigation of HTTP HOST headers to Slack as the source of features and the data that is being stored in storage 114 should not treated as limiting the claim unless the claim itself expressly claims those aspects. Rather, FIG. 6 is presented here to illustrate a real example of how NSS 110 detects that the client's queries are anomalous. Protocols other than HTTP that involve hostname-based access and other types stored data being used for the investigation may be employed without departing from the spirit of the disclosure.

Queries from real users to cloud resources on cloud applications 108 typically access more than just a resource on the cloud. Cloud applications 108 may provide website elements such as GUI widgets, social group presence, SSL support, reminders/notifications/alerts, content delivery, advertising, and various other elements intended for user interaction. By contrast, malware 116 that is using a cloud resource as aa medium for command and control may not interact with those elements since malware may not require client security and user-experience features. Thus, a client that provides queries to cloud applications with little variance in the cloud-application destination may be controlled by malware.

Cloud C2 Traffic Analyzer 112 in NSS 110 investigates whether a hostname access pattern is anomalous 112g in DNS queries by causing NSS 110 extract features such as the URLs included in the queries.

In an example, malware HTTP traffic to a malicious slack channel 602 only queries slack.com (with 3 queries to files.slack.com, as opposed to over 9000 to slack.com). By comparison, HTTP traffic to slack by an authentic user 604 exhibits a variety of domains, and the distribution of queries is more even (in comparison to 1,973 queries to slack.com, slackb.com was queried 1,115 times, a.slack-edge.com was queried 698 times, slack-imgs.com was queried 285 times, etc.)

Storage 114 contains a standard query profile 606.

Standard query profile 606 enables NSS 110 to determine when the HTTP traffic hostname access pattern significantly diverges from a typical to Slack.com access pattern. The profile may be as simple as recording a list of domains associated with Slack by users in general (and NSS 110 determines if a threshold number of domains have been queried in a set period of time), or may involve profiling each user's interactions with Slack and the HTTP traffic that are generated during a user's session. It may also include histogram information about the distribution of URLs made during a typical query to a particular hostname, for comparison to a clients distribution of URLs over a session. Thus, sessions to slack.com that exhibit atypical hostname access (for example, the number of hostname URLs lower than some threshold deviation), could indicate an anomalous hostname access pattern. The deviation could be preset to indicate a spike, or could be configurable by a network administrator.

Additionally or alternatively, standard query profile 606 may also provide frequency of access to a hostname by the organization at large, or a blacklist policy. If no one in the organization uses Slack or if the organization is not permitted to use Slack, then any query to Slack is likely anomalous.

After analysis of the extracted features is complete, Cloud C2Traffic Analyzer 112 detects whether the signal of anomalous hostname access pattern is provided in the incoming request 202.

Malicious Task Sequence

Figure 7B:
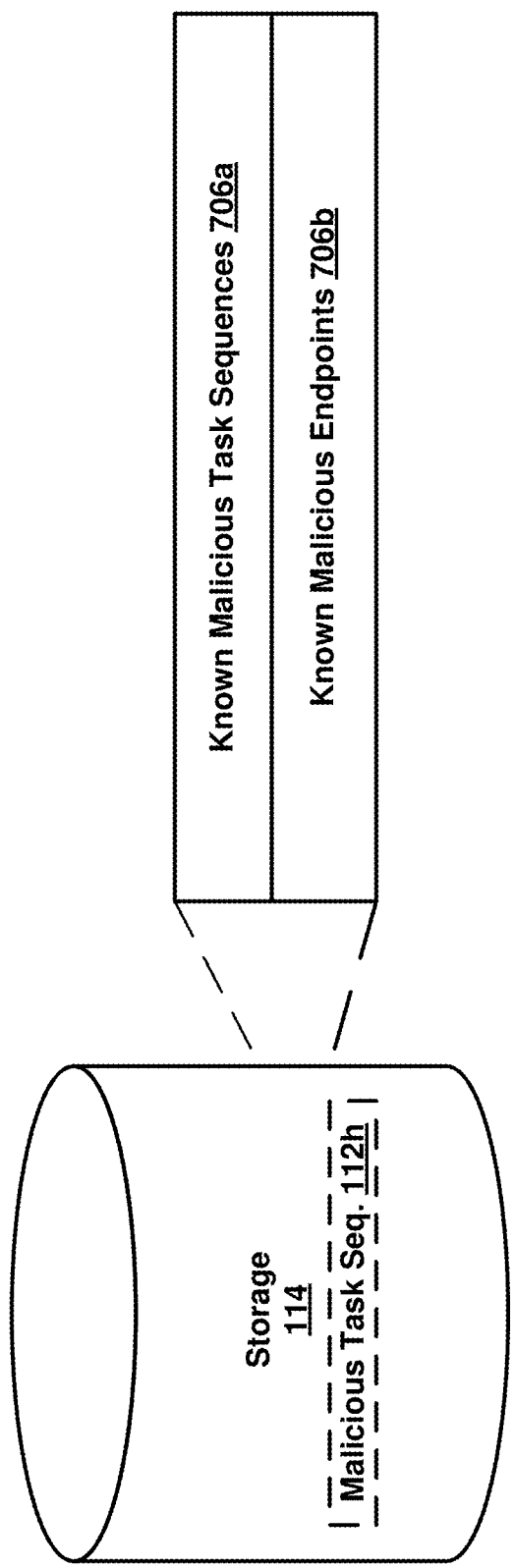

FIGS. 7A and 7B illustrate an example of malicious task sequence and stored comparison data.

As a reminder, this figure follows the environment and scenario of FIG. 1, so the use of Custom Command and Control (C3) and the data that is being stored in storage 114 should not treated as limiting the claim unless the claim itself expressly claims those aspects. A person having ordinary skill in the art would understand that malicious task sequences may be detected from software other than C3, including tools that are not part of a security testing kit but designed to carry out real attacks. Rather, FIGS. 7A and 7B are presented here to illustrate a real example of how malicious task sequences can be detected by NSS 110.

C3 is an open-source framework that permits security testing Red Teams to rapidly create command and control channels to simulate real-world attacks using different C2 channels. The framework includes code that an organization's simulated attacker can modify to simulate an infiltration attempt on the organization, including simulated malicious attack sequences (such as download-delete-upload as discussed above).

Rapid deployment of C2 channels is not only of interest for simulated attackers, but also real attackers, so real attackers may use the same open source tools to develop and use C2 channels. Thus, detecting whether cloud traffic contains characteristics of C2 security testing tool use may provide evidence of a real attack.

In particular, FIG. 7A illustrates an example of C3 endpoints and C3 code. C3 default endpoints 702 are a short list of hardcoded endpoints that are hardcoded in the C3 source code. The C3 code 704 for function GetMessagesByDirection( ) is provided. The string of interest for this example is "std::string url=OBF(https://api.dropboxapi.com/2/files/search_v2). This is same string as row for C3 Default Endpoints.

An attacker who is impatient, or who perhaps has more skill in using code than understanding code, may opt to use the default endpoints. Thus, detecting those known endpoints in an incoming request may indicate malicious C2 cloud traffic.

Along the same reasoning (but not expressly shown in this figure), pre-created source code may have example hardcoded sequences of tasks for a compromised client to perform.

In particular, FIG. 7B illustrates comparison data stored in storage 114 to investigate whether malicious tasks sequences are suggested by the features extracted from incoming request 202.

Cloud C2 Traffic Analyzer 112 in NSS 110 investigates whether a malicious task sequence 112h in DNS queries by causing NSS 110 extract features such as URLs in the incoming request 202.

Storage 114 contains information that the extracted features may be evaluated against, such as known malicious task sequences 706a and known malicious endpoints 706b.

Known malicious task sequences 706a enables NSS 110 to determine if incoming request 202 is part of a sequence of tasks that fits one of the sequences that are part of C2 tools (e.g. This includes sequences such as download-delete-upload.)

Known malicious endpoints 706b enables NSS to determine if incoming request 202 describes a URL that corresponds to one of the endpoints that are known to be part of attacks.

After analysis of the extracted features is complete, Cloud C2Traffic Analyzer 112 detects whether incoming request 202 is part of a malicious task sequence.

Training and Use of Classifiers

Figure 8:
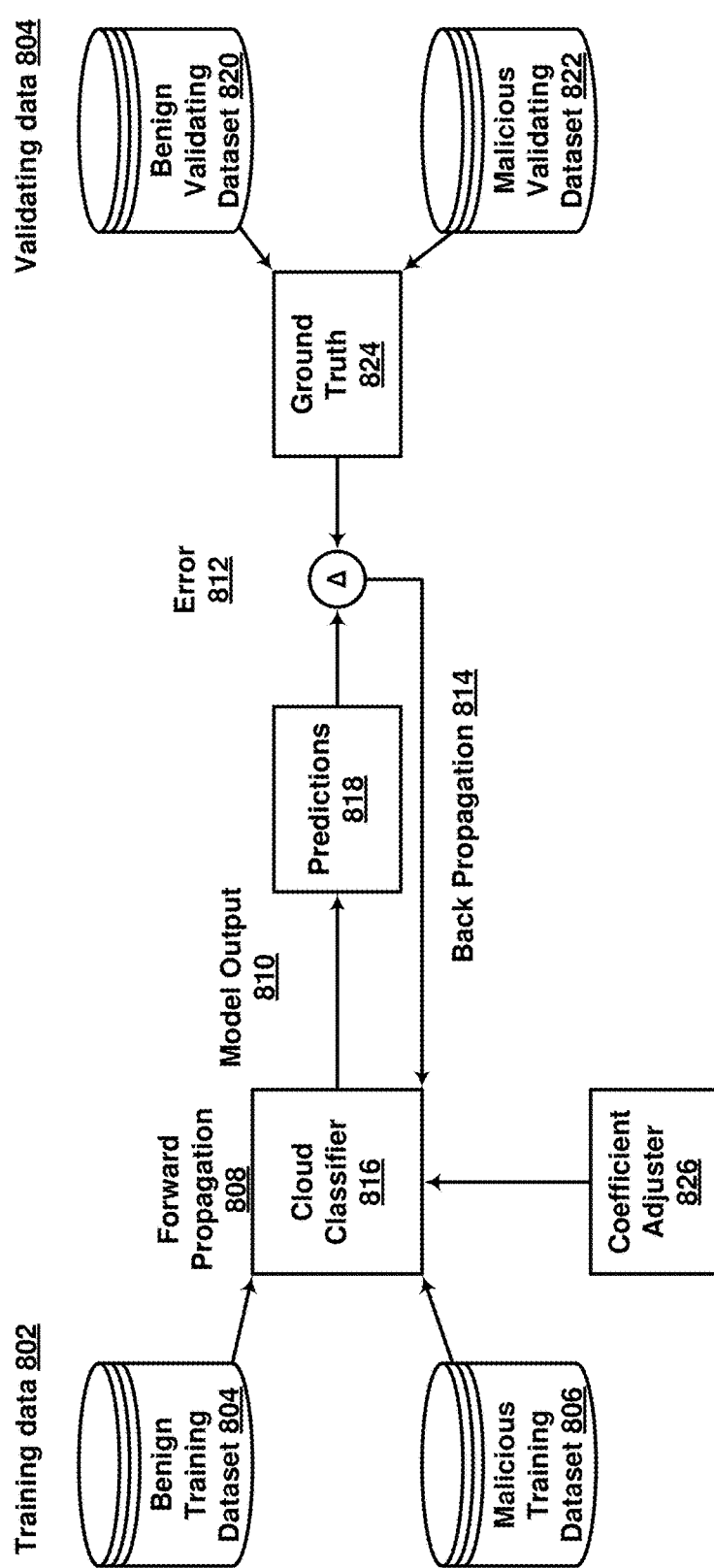
FIG. 8 illustrates an example of training a classifier to classify cloud traffic as malicious C2 traffic or not, using machine learning on benign and malicious training datasets.

FIG. 8 illustrates an example of training a classifier to classify cloud traffic as malicious C2 traffic or not, using machine learning.

Presented in the figure is an initial data set that has been split into two parts: training data 802 and validating data 804. The training data and validating data parts are themselves further split into benign data (i.e. data that represents traffic that is not malicious C2) and malicious data (i.e. data that represents traffic that is malicious C2). Thus, training data 802 comprises benign training dataset 804 and malicious training dataset 806, and validating data 804 comprises benign validating dataset 820 and malicious validating dataset 822.

Also presented are cloud classifier 816, predictions 818, the ground truth 824, and coefficient adjuster 826.

Also presented are steps of a training cycle: forward propagation 808, model output 810, error 812, and back propagation 814.

Data in the datasets are those that can represent packets, data frames, messages, and payload data. Payload data may be images, text (which may be further organized as titles, sections, paragraphs, sentences, words, parts of speech), video, audio, or multimedia combinations thereof.

Cloud classifier 816 can be a machine learning model. Cloud-based classifier may be a rule-based model, a tree-based model, or a machine learning model.

In one implementation, the model that is cloud classifier 816 is a multilayer perceptron (MLP). In another implementation, the model 816 is a feedforward neural network. In yet another implementation, the model 816 is a fully-connected neural network. In a yet further implementation, the model 816 is a semantic segmentation neural network. In a yet another further implementation, the model 816 is a generative adversarial network (GAN) (e.g., CycleGAN, StyleGAN, pixelRNN, text-2-image, DiscoGAN, IsGAN). In a yet another implementation, the model 816 includes self-attention mechanisms like Transformer, Vision Transformer (ViT), Bidirectional Transformer (BERT), Detection Transformer (DETR), Deformable DETR, UP-DETR, DeiT, Swin, GPT, iGPT, GPT-2, GPT-3, BERT, SpanBERT, RoBERTa, XLNet, ELECTRA, UniLM, BART, T5, ERNIE (THU), KnowBERT, DeiT-Ti, DeiT-S, DeiT-B, T2T-ViT-14, T2T-ViT-19, T2T-ViT-24, PVT-Small, PVT-Medium, PVT-Large, TNT-S, TNT-B, CPVT-S, CPVT-S-GAP, CPVT-B, Swin-T, Swin-S, Swin-B, Twins-SVT-S, Twins-SVT-B, Twins-SVT-L, Shuffle-T, Shuffle-S, Shuffle-B, XCiT-S12/16, CMT-S, CMT-B, VOLO-D1, VOLO-D2, VOLO-D3, VOLO-D4, MoCo v3, ACT, TSP, Max-DeepLab, VisTR, SETR, Hand-Transformer, HOT-Net, METRO, Image Transformer, Taming transformer, TransGAN, IPT, TTSR, STTN, Masked Transformer, CLIP, DALL-E, Cogview, UniT, ASH, TinyBert, FullyQT, ConvBert, FCOS, Faster R-CNN+FPN, DETR-DC5, TSP-FCOS, TSP-RCNN, ACT+MKDD (L=32), ACT+MKDD (L=16), SMCA, Efficient DETR, UP-DETR, UP-DETR, ViTB/16-FRCNN, ViT-B/16-FRCNN, PVT-Small+RetinaNet, Swin-T+RetinaNet, Swin-T+ATSS, PVT-Small+DETR, TNT-S+DETR, YOLOS-Ti, YOLOS-S, and YOLOS-B.

In one implementation, the model 816 is a convolution neural network (CNN) with a plurality of convolution layers. In another implementation, the model 816 is a recurrent neural network (RNN) such as a long short-term memory network (LSTM), bi-directional LSTM (Bi-LSTM), or a gated recurrent unit (GRU). In yet another implementation, the model 816 includes both a CNN and an RNN.

In yet other implementations, the model 816 can use 1D convolutions, 2D convolutions, 3D convolutions, 4D convolutions, 5D convolutions, dilated or atrous convolutions, transpose convolutions, depthwise separable convolutions, pointwise convolutions, 1×1 convolutions, group convolutions, flattened convolutions, spatial and cross-channel convolutions, shuffled grouped convolutions, spatial separable convolutions, and deconvolutions. The model 816 can use one or more loss functions such as logistic regression/log loss, multi-class cross-entropy/softmax loss, binary cross-entropy loss, mean-squared error loss, L1 loss, L2 loss, smooth L1 loss, and Huber loss. The model 816 can use any parallelism, efficiency, and compression schemes such TFRecords, compressed encoding (e.g., PNG), sharding, parallel calls for map transformation, batching, prefetching, model parallelism, data parallelism, and synchronous/asynchronous stochastic gradient descent (SGD). The model 816 can include upsampling layers, downsampling layers, recurrent connections, gates and gated memory units (like an LSTM or GRU), residual blocks, residual connections, highway connections, skip connections, peephole connections, activation functions (e.g., non-linear transformation functions like rectifying linear unit (ReLU), leaky ReLU, exponential liner unit (ELU), sigmoid and hyperbolic tangent (tanh)), batch normalization layers, regularization layers, dropout, pooling layers (e.g., max or average pooling), global average pooling layers, and attention mechanisms.

The model 816 can be a linear regression model, a logistic regression model, an Elastic Net model, a support vector machine (SVM), a random forest (RF), a decision tree, and a boosted decision tree (e.g., XGBoost), or some other tree-based logic (e.g., metric trees, kd-trees, R-trees, universal B-trees, X-trees, ball trees, locality sensitive hashes, and inverted indexes). The model 816 can be an ensemble of multiple models, in some implementations.

In some implementations, the model 816 can be trained using backpropagation-based gradient update techniques. Example gradient descent techniques that can be used for training the model 816 include stochastic gradient descent, batch gradient descent, and mini-batch gradient descent. Some examples of gradient descent optimization algorithms that can be used to train the model 816 are Momentum, Nesterov accelerated gradient, Adagrad, Adadelta, RMSprop, Adam, AdaMax, Nadam, and AMSGrad.

Notably, the above are merely examples, and do not limit the scope of the disclosure. Rather, the full implied understanding of those skilled in the art is captured. For example, strictly speaking, Kohonen Self Organizing Map (SOM) do not have a back propagation step, yet a person having ordinary skill in the art would envisage SOM as a model for a cloud classifier.

When initiating the training process, a system constructs cloud classifier 816 with random coefficients. Additionally, the validating data 804 is processed and the ground truth 824 for benign validating dataset 820 and malicious validating dataset 822 is created. In this particular example, the ground truth dictates whether particular traffic was indeed malicious or benign.

During forward propagation step 808, both individual entries in the benign training dataset 804 and malicious training dataset 806 are input though one or more successive layers of nodes in cloud classifier 816. As the input "propagates" through layers of notes, it is adjusted. The final output of the cloud classifier is a score or vector.

During model output step 810, the score is measured against one or more threshold boundaries which define ranges of multi-dimensional regions. Depending upon which range or region that score or vector falls, the classifier performs prediction 818 as to whether the cloud traffic represented by the training input is malicious or benign.

During error step 812, the training system compares the predictions (along with the scores or vectors used to craft those predictions) with the ground truth, and the differences between the prediction scores and ground truth are treated as a cost. Using a gradient descent optimization algorithm, the training system determines direction of change (+ or −) to each coefficients, in order to minimize cost. Each coefficient is checked against the nodes it immediately influences to determine its contribution to the cost.

During the back propagation step 814, coefficient adjuster 826 update the coefficients in cloud classifier 816 based on some learning distance (typically symbolized as $\alpha$). $\alpha$ is decayed, so that coefficients do not swap back and forth two identical states in successive training iterations.

Finally, the training system determines if a new training iteration occurs. Training may stop after a threshold accuracy/cost is achieved, or after a maximum number of iterations occurs.

One caveat to the above illustration is that it assumes that all data is labeled as malicious or benign. Although that is ideal, fully labeled data is not always available in practice. Malicious and benign are binary outcomes, so in situations where all rows in the training dataset are known, perhaps only malicious traffic is recorded as such and supervised learning otherwise proceeds as described above. More commonly, only some of the training dataset have known correct classification outcomes (labeled), and others do not. Sometimes, no data is labeled. To expressly set forth that a cloud traffic classifier may in trained in circumstances other than with fully labeled data, FIG. 9 is presented below.

Figure 9:
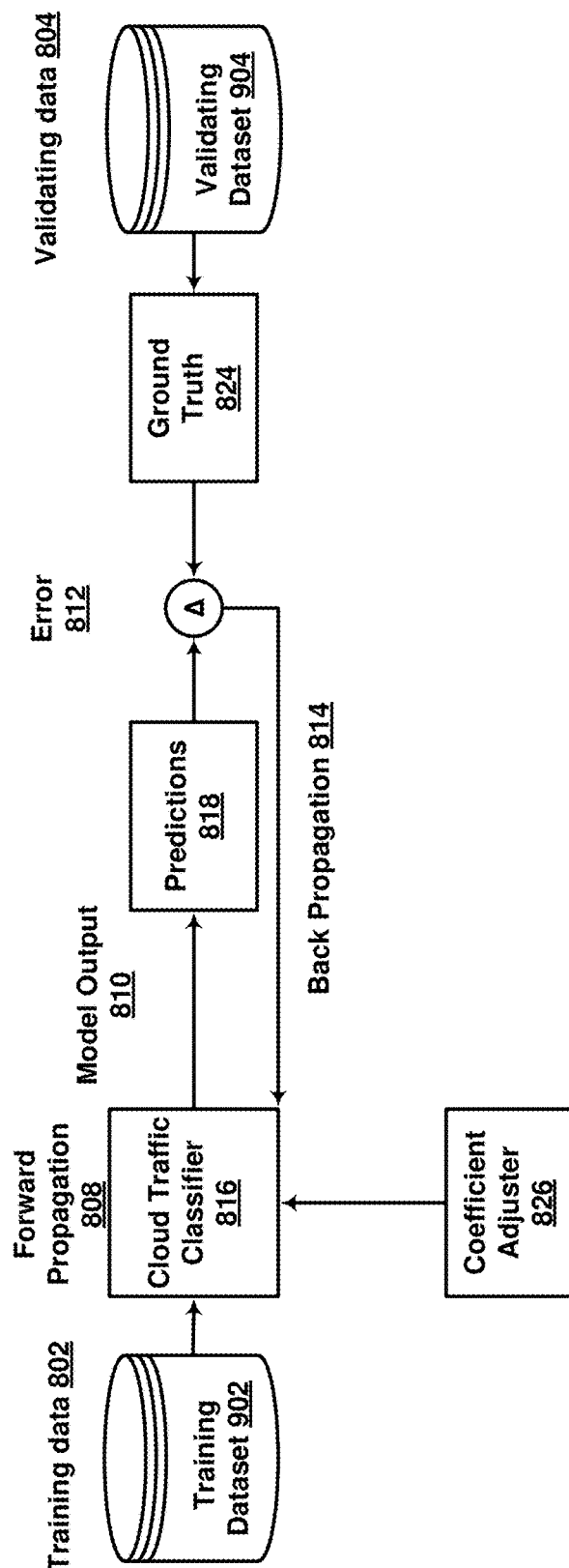
FIG. 9 illustrates an example of training a classifier to classify cloud traffic as malicious C2 traffic or not, without divisions of malicious and benign datasets.

FIG. 9 illustrates an example of training a classifier to classify cloud traffic as malicious C2 traffic or not, without divisions of malicious and benign datasets.

Most part numbers are identical to that in FIG. 8, and so are not reintroduced here. The exceptions are training dataset 902 and validating dataset 904, which replace 804, 806, 820, and 822. FIG. 9 expressly makes no distinction between "benign" and "malicious" flavors of datasets, but rather, emphasizes that a training dataset and a validating dataset is used.

However trained, a classifier is then used by NSS 110 to determine what traffic to continue to pass through and what traffic to block.

Figure 10:
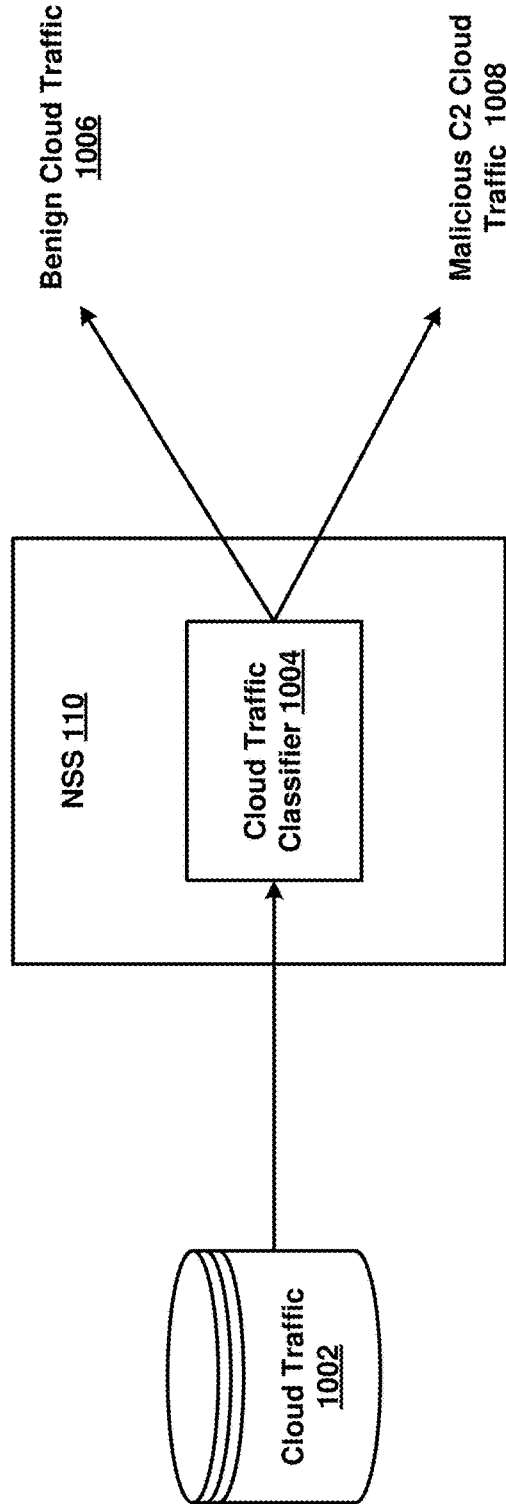
FIG. 10 illustrates the network security system using the cloud traffic classifier to classify cloud traffic as benign or malicious.

FIG. 10 illustrates the network security system using the cloud traffic classifier to classify cloud traffic as benign or malicious. Specifically, various signals drawn from intercepted cloud traffic 1002 is provided as input into a cloud traffic classifier.

If cloud traffic is benign, then no action is taken besides releasing the incoming request to communicate with the cloud, such as described in U.S. application Ser. No. 17/237,877, titled "Synthetic Request Injection To Retrieve Expired Metadata For Cloud Policy Enforcement", filed 22 Apr. 2021, which is incorporated by reference in its entirety. If the cloud traffic as classified as malicious, then classification of other system elements may result. For example, client 102*a* could be classified as an infected host. The incoming request itself may be classified as having originated from malware. As another example, the resource on one of cloud application 108 may be classified as a malicious C2 cloud resource.

As a result of such additional classifications, an infected host's other communications may be more closely scrutinized (or even blocked entirely) until further remediation occurs. Moreover, any communication to a malicious resource (whether by an infected client or uninfected client) may be blocked.

Computer System

Figure 11:
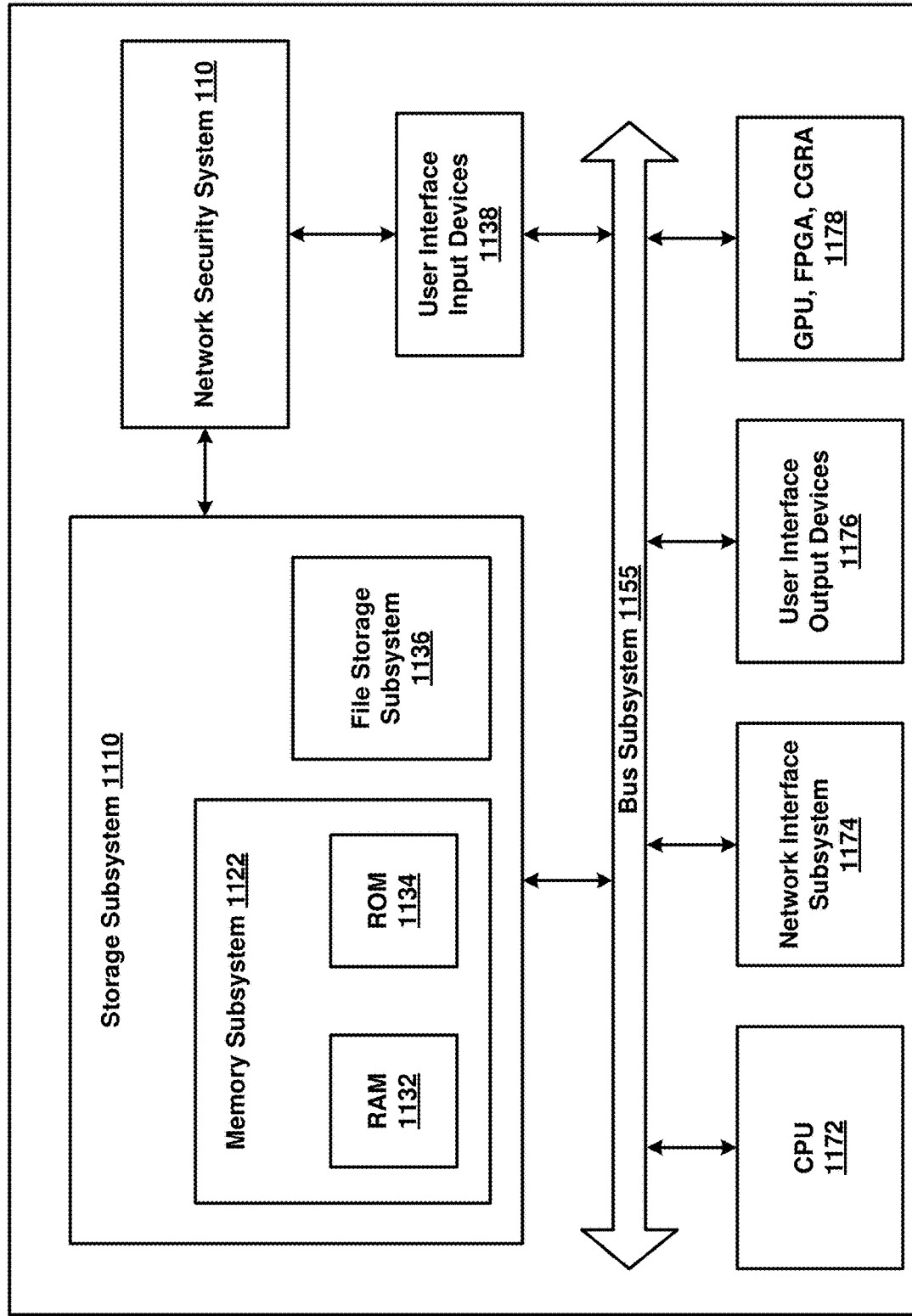
FIG. 11 is a block diagram of an example computer system.

FIG. 11 shows an example computer system 1100 that can be used to implement the technology disclosed. Computer system 1100 includes at least one central processing unit (CPU) 1172 that communicates with a number of peripheral devices via bus subsystem 1155. These peripheral devices can include a storage subsystem 1110 including, for example, memory devices and a file storage subsystem 1136, user interface input devices 1138, user interface output devices 1176, and a network interface subsystem 1174. The input and output devices allow user interaction with computer system 1100. Network interface subsystem 1174 provides an interface to outside networks, including an interface to corresponding interface devices in other computer systems.

In one implementation, the annotation network 110 is communicably linked to the storage subsystem 1110 and the user interface input devices 1138.

User interface input devices 1138 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1100.

User interface output devices 1176 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1100 to the user or to another machine or computer system.

Storage subsystem 1110 stores programming and data constructs that provide the functionality of some or all of the modules and methods described herein. These software modules are generally executed by processors 1178.

Processors 1178 can be graphics processing units (GPUs), field-programmable gate arrays (FPGAs), application-specific integrated circuits (ASICs), and/or coarse-grained reconfigurable architectures (CGRAs). Processors 1178 can be hosted by a deep learning cloud platform such as Google Cloud Platform™, Xilinx™, and Cirrascale™. Examples of processors 1178 include Google's Tensor Processing Unit (TPU)™, rackmount solutions like GX4 Rackmount Series™, GX52 Rackmount Series™, NVIDIA DGX-1™, Microsoft' Stratix V FPGA™, Graphcore's Intelligent Processor Unit (IPU)™, Qualcomm's Zeroth Platform™ with Snapdragon processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, Lambda GPU Server with Testa V100s™, and others.

Memory subsystem 1122 used in the storage subsystem 1110 can include a number of memories including a main random access memory (RAM) 1132 for storage of instructions and data during program execution and a read only memory (ROM) 1134 in which fixed instructions are stored. A file storage subsystem 1136 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1136 in the storage subsystem 1110, or in other machines accessible by the processor.

Bus subsystem 1155 provides a mechanism for letting the various components and subsystems of computer system 1100 communicate with each other as intended. Although bus subsystem 1155 is shown schematically as a single bus, alternative implementations of the bus subsystem can use multiple busses.

Computer system 1100 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1100 depicted in FIG. 52 is intended only as a specific example for purposes of illustrating the preferred implementations of the present invention. Many other configurations of computer system 1100 are possible having more or less components than the computer system depicted in FIG. 52.

Particular Implementations

The technology disclosed relates to detecting malicious communication between a command and control (C2) cloud resource on a cloud application and malware on an infected host. The technology disclosed also relates to training and using a classifier as part of detection.

Detection

The method implementation of the disclosed technology from the perspective of a network security system (NSS) includes one or more clients communicating, via a secure tunnel, to one or more cloud applications.

One or more requests from a client to the cloud applications are rerouted to the NSS. Such requests are analyzed for evidence that request is part of a malicious communication between malware on the client and a command and control (C2) cloud resource.

Where the analysis determines that the request is benign, the communication is permitted. Where the analysis determines that the request is part of a malicious communication that is targeted at malicious resources, the communication to that particular resource is blocked. However, other communications to other resources in the cloud application may still be permitted.

This method implementation and other methods disclosed optionally include one or more of the following features. The method can also include features described in connection with the system disclosed. In the interest of conciseness, alternative combinations of features are not individually enumerated. Features applicable to systems, methods, and articles of manufacture are not repeated for each statutory class set of base features. The reader will understand how features identified in this section can readily be combined with base features in other statutory classes.

The method can additionally include detecting beaconing behavior.

Detection can occur based on the incoming requests making frequent checks to a same unified resource locator (URL), based on the incoming requests being issued by previously unexecuted processes on the client, based on the incoming requests attempting to transmit contents that have substantially similar data sizes with respect to an absolute range (perhaps with a difference in size of less than 1 KB), or as a statistical measure (e.g. standard deviations from a mean value of normally distributed data), or may be sized identically.

The detection can also occur based on the incoming requests being iteratively issued using a same Hypertext Transfer Protocol (HTTP) method and receiving failed responses.

The method can additionally include detecting that the incoming request is en route to an anomalous entity.

The entities may be those such as channels, repositories, or in general, any instances of cloud application resources. The method may involve detecting an anomalous entity by determining that the entity being used is part of an unsanctioned cloud application instance. Detecting an anomalous entity may involve determining the aggregate usage frequency of the entities. The particular resource may be detected as anomalous because the aggregate usage frequency of the particular entity being measured is less than the aggregate usage frequencies for other entities.

The method can additionally include detecting that the incoming request uses an anomalous username to access the cloud application.

Detection of anomalous username may be the result of determining that the username is a previously unused username. It could also be based on the username not complying with a rule, such as a regular expression/template/detected pattern with respect to usernames.

The method can include detecting that the incoming request uses an anomalous authentication to access the cloud application.

Detecting may occur based on determining that the particular authentication method was previously unused. It may also occur based on finding that it is contrary to the organization's authentication policy.

The method can additionally include detecting that the incoming request is evidence of a cat's paw behavior of the client.

Detecting cat's paw behavior may occur when the client is detected as performing repeated operations with cloud resources. The repeated operations may be repeated download-upload of content, or download-delete-upload of content. The content may be encrypted or encoded. The content may be related to tasks, such as tasks given by an attacker for an infected host to perform, deletion of the tasks to evade computer forensics, and uploading the results of the tasks.

The method can additionally include detecting that incoming requests use anomalous hostname access patterns.

Detecting anomalous hostname patterns may occur when the incoming requests are attempting to access unsanctioned domain names impersonating sanctioned domain names of the cloud application. Detection may also occur when queries are sent to fewer domain names than the number of domain names than that of a query created by a user.

The method can additionally include detecting malicious task sequences being attempted by incoming requests.

Detecting a malicious task sequence may occur when the malicious task sequence matches one or more known malicious task sequences, such as download-upload-delete sequences. Detecting a malicious task sequence may also occur when the malicious task sequence is directed to endpoints that are harcoded into malware that was detected on the client, and further that the incoming request is from the malware. Detecting a malicious task sequence may also occur when the malicious task sequence is directed to known malicious endpoints—that is to say, API endpoints that are known to be referenced by malicious software.

After analysis, the method may perform one or more classifications. Incoming requests may be classified as malicious communications or part of malicious communications. The client may be classified as an infected host. The malicious resource may be classified as a command and control cloud resource.

Future incoming requests to the malicious resource are blocked. The future incoming requests could be from the same client, or from different clients of the plurality of clients.

This method and other implementations of the technology disclosed can each optionally include one or more additional features described.

Other implementations may include a non-transitory computer readable storage medium storing instructions executable by a processor to perform a method as described above. Yet another implementation may include a system including memory and one or more processors operable to execute instructions, stored in the memory, to perform a method as described above.

Training

The method implementation of the disclosed technology from the perspective of a system that trains a cloud traffic classifier.

Initially, example are divided into a two sets: a malicious training example set and a benign training example set. The training example sets include blocks of transactions of one or more data communication/transport protocols (such as HTTP). The example training sets may be previously extracted features or may be whole messages. A classifier with arbitrary initial coefficients is also instantiated.

As training, the blocks of malicious transactions are input into the cloud traffic classifier, and the outputs of the cloud traffic classifier are classified as malicious C2 cloud traffic. Additionally, the blocks of benign transactions are input into the cloud traffic classifier, and the outputs of the cloud traffic classifier are classified as benign cloud traffic.

The data in the example training sets may be from particular fields of a given protocol or could be metadata derived from the examples. For example, using HTTP as an example, the extracted features could include HTTP request data, HTTP header data, parameter data, cookie data, body data, URL, transaction methods, body size, transaction version number, user agent identifier (such as OS identifier), host identifier, authorization identifier, username, and/or connection type The data in the example training sets could also include HTTP response data such as HTTP header data, parameter data, cookie data, body data, and/or response codes.

The data in the example training sets could also include a process name, executable name, a port number, API data of a sanction applications or unsanctioned applications, a count of hostnames in a block of transactions, and uploaded file, a downloaded file, and/or a sequence of transactions.

The trainer can train the classifier to detect one or more signals using one or more extracted features, as described in the section "Detection," above.

This method and other implementations of the technology disclosed can each optionally include one or more additional features described.

Other implementations may include a non-transitory computer readable storage medium storing instructions executable by a processor to perform a method as described above. Yet another implementation may include a system including memory and one or more processors operable to execute instructions, stored in the memory, to perform a method as described above.

Classifier

The method implementation of the disclosed technology from the perspective of a network security system using cloud traffic classifier to perform analysis.

The network security system intermediates cloud traffic between a plurality of clients and a plurality of cloud applications over a secure tunnel. The cloud traffic is rerouted to the network security system.

A classifier, in communication with the network security system, processes the cloud traffic as input, and generates an output classifying the cloud traffic as malicious command and control (C2) cloud traffic or benign cloud traffic.

The classifier may also perform classification by detecting one or more signals by one or more extracted featured, as described in the section "Detection," above, or data as described in the second "Training," above.

This method and other implementations of the technology disclosed can each optionally include one or more additional features described.

Other implementations may include a non-transitory computer readable storage medium storing instructions executable by a processor to perform a method as described above. Yet another implementation may include a system including memory and one or more processors operable to execute instructions, stored in the memory, to perform a method as described above.

We claim:

1. A system including one or more processors coupled to memory, the memory loaded with computer instructions to detect malicious transactions, the instructions, when executed on the processors, implement actions comprising:

intermediating, by a network security system, cloud traffic between a plurality of clients and a plurality of cloud applications over a secure tunnel established between the plurality of clients and the network security system, wherein the secure tunnel reroutes the cloud traffic to the network security system;

processing, by a trained cloud traffic classifier, in communication with the network security system, the cloud traffic as an input; and generating, by the trained cloud traffic classifier, an output that classifies the cloud traffic as malicious command and control (C2) cloud traffic or benign cloud traffic, wherein the cloud traffic comprises blocks of transactions, and the trained cloud traffic classifier is trained to detect a beaconing behavior of malicious transactions in the blocks of transactions based on the malicious transactions comprising frequent checks to a same universal resource locator ("URL").

2. The system of claim 1, wherein the cloud traffic classified as malicious C2 cloud traffic are malicious HyperText Transfer Protocol (HTTP) or HyperText Transfer Protocol Secure (HTTPS) transactions, and the cloud traffic classified as benign cloud traffic are benign HTTP or HTTPS transactions.

3. The system of claim 1, wherein the plurality of cloud applications are sanctioned by at least one organization.

4. The system of claim 1, wherein the plurality of clients is managed by at least one organization.

5. The system of claim 1, wherein the trained cloud traffic classifier is further trained to detect the beaconing behavior of the malicious transactions based on repeated hypertext transfer protocol (HTTP) get attempts and failures.

6. The system of claim 1, wherein the trained cloud traffic classifier is further trained to:

detect first malicious transactions in the blocks of transactions based on the first malicious transactions being en route to an anomalous entity on a cloud application in the plurality of cloud applications, wherein:

an aggregate usage frequency of a particular instance is a measure of how often the particular instance is used by the plurality of clients; and the particular instance is identified as the anomalous entity based on a determination that the aggregate usage frequency of the particular instance is less than other instances in a plurality of instances; or detect second malicious transactions in the blocks of transactions based on the second malicious transactions originating from an anomalous agent, wherein:

the anomalous agent is a particular web browser in a plurality of web browsers installed on a client; and the particular web browser is identified as the anomalous agent based on a determination that the particular web browser is an obsolete web browser; or detect third malicious transactions in the blocks of transactions based on the third malicious transactions using an anomalous username to access a sanctioned cloud application in the plurality of cloud applications, wherein a particular username is identified as an anomalous username based on a determination that the particular username is a previously unused username; or detect fourth malicious transactions in the blocks of transactions based on the fourth malicious transactions using an anomalous authentication method to access a sanctioned cloud application in the plurality of cloud applications, wherein a particular authentication method is identified as the anomalous authentication method based on a determination that the particular authentication method is a previously unused authentication method.

7. The system of claim 1, wherein the trained cloud traffic classifier is further trained to detect a cat's-paw behavior of some clients in the plurality of clients, wherein the cat's-paw behavior is detected based on a determination that the some clients are repeatedly downloading, deleting, and uploading content from malicious C2 cloud resources.

8. The system of claim 1, wherein the trained cloud traffic classifier is further trained to:
detect second malicious transactions in the blocks of transactions based on the second malicious transactions exhibiting an anomalous hostname access pattern behavior, wherein the anomalous hostname access pattern behavior is detected based on a determination that an unsanctioned executable impersonating as a sanctioned executable of a sanctioned cloud application of the plurality of cloud applications is querying to fewer domain names than a number of domains names the sanctioned executable is configured to use to access the sanctioned cloud application.

9. The system of claim 1, wherein the trained cloud traffic classifier is further trained to:
detect second malicious transactions in the blocks of transactions based on the second malicious transactions exhibiting an anomalous hostname access pattern behavior, wherein the anomalous hostname access pattern behavior is detected based on an anomalous distribution of queries to different domain names.

10. The system of claim 1, wherein the trained cloud traffic classifier is further trained to:
detect second malicious transactions in the blocks of transactions based on the second malicious transactions attempting a malicious task sequence execution, wherein the malicious task sequence execution is detected based on a determination that the second malicious transactions are directed to endpoints hardcoded into a malware detected on a client.

11. A computer-implemented method of employing a cloud traffic classifier to detect malicious command and control traffic, comprising:
intermediating, by a network security system, cloud traffic between a plurality of clients and a plurality of cloud applications over a secure tunnel established between the plurality of clients and the network security system, wherein the secure tunnel reroutes the cloud traffic to the network security system; and
processing, by a trained cloud traffic classifier in communication with the network security system, the cloud traffic as an input and generating an output that classifies the cloud traffic as malicious command and control (C2) cloud traffic or benign cloud traffic, wherein the cloud traffic comprises blocks of transactions, and the trained cloud traffic classifier is trained to detect a beaconing behavior of malicious transactions in the blocks of transactions based on the malicious transactions comprising frequent checks to a same universal resource locator ("URL").

12. The computer-implemented method of claim 11, wherein the trained cloud traffic classifier is further trained to detect the beaconing behavior of the malicious transactions based on repeated hypertext transfer protocol (HTTP) get attempts and failures.

13. The computer-implemented method of claim 11, wherein the trained cloud traffic classifier is further trained to:
detect first malicious transactions in the blocks of transactions based on the first malicious transactions being en route to an anomalous entity on a cloud application in the plurality of cloud applications, wherein:
an aggregate usage frequency of a particular instance is a measure of how often the particular instance is used by the plurality of clients; and
the particular instance is identified as the anomalous entity based on a determination that the aggregate usage frequency of the particular instance is less than other instances in a plurality of instances; or
detect second malicious transactions in the blocks of transactions based on the second malicious transactions originating from an anomalous agent, wherein:
the anomalous agent is a particular web browser in a plurality of web browsers installed on a client; and
the particular web browser is identified as the anomalous agent based on a determination that the particular web browser is an obsolete web browser; or
detect third malicious transactions in the blocks of transactions based on the third malicious transactions using an anomalous username to access a sanctioned cloud application in the plurality of cloud applications, wherein a particular username is identified as an anomalous username based on a determination that the particular username is a previously unused username; or
detect fourth malicious transactions in the blocks of transactions based on the fourth malicious transactions using an anomalous authentication method to access a sanctioned cloud application in the plurality of cloud applications, wherein a particular authentication method is identified as the anomalous authentication method based on a determination that the particular authentication method is a previously unused authentication method.

14. The computer-implemented method of claim 11, wherein the trained cloud traffic classifier is further trained to detect a cat's-paw behavior of some clients in the plurality of clients, wherein the cat's-paw behavior is detected based on a determination that the some clients are repeatedly downloading, deleting, and uploading content from malicious C2 cloud resources.

15. The computer-implemented method of claim 11, wherein the trained cloud traffic classifier is further trained to:
detect second malicious transactions in the blocks of transactions based on the second malicious transactions exhibiting an anomalous hostname access pattern behavior, wherein:

the anomalous hostname access pattern behavior is detected based on a determination that an unsanctioned executable impersonating as a sanctioned executable of a sanctioned cloud application of the plurality of cloud applications is querying to fewer domain names than a number of domains names the sanctioned executable is configured to use to access the sanctioned cloud application.

16. The computer-implemented method of claim 11, wherein the trained cloud traffic classifier is further trained to:
  detect second malicious transactions in the blocks of transactions based on the second malicious transactions exhibiting an anomalous hostname access pattern behavior, wherein the anomalous hostname access pattern behavior is detected based on an anomalous distribution of queries to different domain names.

17. The computer-implemented method of claim 11, wherein the trained cloud traffic classifier is further trained to:
  detect second malicious transactions in the blocks of transactions based on the second malicious transactions attempting a malicious task sequence execution, wherein the malicious task sequence execution is detected based on a determination that the second malicious transactions are directed to endpoints hardcoded into a malware detected on a client.

18. A non-transitory, computer-readable storage medium impressed with computer program instructions to employ a cloud traffic classifier to detect malicious command and control traffic, the instructions, when executed on a processor, implement a method comprising:
  intermediating, by a network security system, cloud traffic between a plurality of clients and a plurality of cloud applications over a secure tunnel established between the plurality of clients and the network security system, wherein the secure tunnel reroutes the cloud traffic to the network security system; and
  processing, by a trained cloud traffic classifier in communication with the network security system, the cloud traffic as an input and generating an output that classifies the cloud traffic as malicious command and control (C2) cloud traffic or benign cloud traffic, wherein the cloud traffic comprises blocks of transactions, and the trained cloud traffic classifier is trained to detect a beaconing behavior of malicious transactions in the blocks of transactions based on the malicious transactions comprising frequent checks to a same universal resource locator ("URL").

19. The non-transitory, computer-readable storage medium of claim 18, wherein the cloud traffic comprises blocks of transactions, and the trained cloud traffic classifier is further trained to detect:
  an anomaly by:
    first malicious transactions in the blocks of transactions based on the first malicious transactions being en route to an anomalous entity on a cloud application in the plurality of cloud applications, wherein:
      an aggregate usage frequency of a particular instance is a measure of how often the particular instance is used by the plurality of clients; and
      the particular instance is identified as the anomalous entity based on a determination that the aggregate usage frequency of the particular instance is less than other instances in a plurality of instances; or
    second malicious transactions in the blocks of transactions based on the second malicious transactions originating from an anomalous agent, wherein:
      the anomalous agent is a particular web browser in a plurality of web browsers installed on a client; and
      the particular web browser is identified as the anomalous agent based on a determination that the particular web browser is an obsolete web browser; or
    third malicious transactions in the blocks of transactions based on the third malicious transactions using an anomalous username to access a sanctioned cloud application in the plurality of cloud applications, wherein a particular username is identified as an anomalous username based on a determination that the particular username is a previously unused username; or
    fourth malicious transactions in the blocks of transactions based on the fourth malicious transactions using an anomalous authentication method to access a sanctioned cloud application in the plurality of cloud applications, wherein a particular authentication method is identified as the anomalous authentication method based on a determination that the particular authentication method is a previously unused authentication method;
  a cat's-paw behavior of some clients in the plurality of clients, wherein the cat's-paw behavior is detected based on a determination that the some clients are repeatedly downloading, deleting, and uploading content from malicious C2 cloud resources;
  an anomalous hostname access pattern behavior based on a determination that an unsanctioned executable impersonating as a sanctioned executable of a sanctioned cloud application of the plurality of cloud applications is querying to fewer domain names than a number of domains names the sanctioned executable is configured to use to access the sanctioned cloud application; and
  a malicious task sequence execution based on a determination that fifth malicious transactions are directed to endpoints hardcoded into a malware detected on the client.

20. The non-transitory, computer-readable storage medium of claim 18, wherein the cloud traffic classified as malicious C2 cloud traffic-are malicious HyperText Transfer Protocol (HTTP) transactions, and the cloud traffic classified as benign cloud traffic are benign HTTP transactions.

* * * * *